(12) United States Patent
Li et al.

(10) Patent No.: US 11,233,940 B2
(45) Date of Patent: Jan. 25, 2022

(54) PHOTOGRAPHING METHOD AND TERMINAL

(71) Applicant: HUAWEI TECHNOLOGIES CO., LTD., Guangdong (CN)

(72) Inventors: Xiaolong Li, Shanghai (CN); Gang Wu, Shanghai (CN); Shuang Zhao, Shenzhen (CN); Gang He, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 153 days.

(21) Appl. No.: 16/492,587

(22) PCT Filed: May 5, 2017

(86) PCT No.: PCT/CN2017/083337
§ 371 (c)(1),
(2) Date: Sep. 9, 2019

(87) PCT Pub. No.: WO2018/161426
PCT Pub. Date: Sep. 13, 2018

(65) Prior Publication Data
US 2020/0053283 A1 Feb. 13, 2020

(30) Foreign Application Priority Data
Mar. 10, 2017 (CN) .......................... 201710142098.8

(51) Int. Cl.
*H04N 5/232* (2006.01)
*H04M 1/72403* (2021.01)

(52) U.S. Cl.
CPC ..... *H04N 5/23245* (2013.01); *H04N 5/23216* (2013.01); *H04N 5/23293* (2013.01); *H04M 1/72403* (2021.01); *H04M 2250/52* (2013.01)

(58) Field of Classification Search
CPC .......... H04N 5/23245; H04N 5/23216; H04N 5/23293; H04N 5/232; H04M 1/72403;
(Continued)

(56) References Cited

U.S. PATENT DOCUMENTS

2005/0094015 A1  5/2005  Kuruma
2007/0291154 A1  12/2007 Moon et al.
(Continued)

FOREIGN PATENT DOCUMENTS

CN    1604622 A    4/2005
CN  101094327 A   12/2007
(Continued)

*Primary Examiner* — Lin Ye
*Assistant Examiner* — Chan T Nguyen
(74) *Attorney, Agent, or Firm* — Womble Bond Dickinson (US) LLP

(57) ABSTRACT

This application relates to a photographing method and a terminal. The terminal includes a front-facing camera, a rear-facing camera, and a touch display screen detects that the front-facing camera is enabled; displays a preview image that is captured in selfie mode by using the front-facing camera; detects an enabling command of a user on a photographing shutter, enters a first user interface, and displays, on the first user interface, a first image and a second image that is a mirror of the first image; and in response to a selection of the user for the first image or the second image displayed on the first user interface, displays an image selected from the first image and the second image.

20 Claims, 20 Drawing Sheets

(58) Field of Classification Search
CPC ......... H04M 2250/52; H04M 1/72469; H04M 2201/34
USPC .................................................... 348/333.11
See application file for complete search history.

(56) References Cited

U.S. PATENT DOCUMENTS

| | | | |
|---|---|---|---|
| 2008/0297622 A1 | 12/2008 | Miyashita | |
| 2015/0015739 A1* | 1/2015 | Peng .................. | H04N 5/23293 348/231.99 |
| 2015/0035723 A1* | 2/2015 | Mori ..................... | G06F 3/1446 345/1.3 |
| 2015/0205183 A1 | 7/2015 | Gsellman | |
| 2016/0269635 A1 | 9/2016 | Ito et al. | |
| 2016/0286131 A1* | 9/2016 | Zhu ................... | H04N 5/23245 |

FOREIGN PATENT DOCUMENTS

| | | | | |
|---|---|---|---|---|
| CN | 103152489 | A | 6/2013 | |
| CN | 104076882 | A | 10/2014 | |
| CN | 104243831 | A | 12/2014 | |
| CN | 105723694 | A | 6/2016 | |
| CN | 105959544 | * | 9/2016 | ......... H04N 5/23216 |
| CN | 105959544 | A | 9/2016 | |
| CN | 105959564 | A | 9/2016 | |
| EP | 2981061 | A1 | 2/2016 | |
| JP | 2002147933 | A | 5/2002 | |
| JP | 2005110097 | A | 4/2005 | |
| JP | 2008300949 | A | 12/2008 | |
| JP | 2014220555 | A | 11/2014 | |
| JP | 2015100002 | A | 5/2015 | |
| JP | 2016143993 | A | 8/2016 | |
| JP | 2017021468 | A | 1/2017 | |
| KR | 20050032473 | A | 4/2005 | |
| WO | 2015015560 | A1 | 2/2015 | |

* cited by examiner

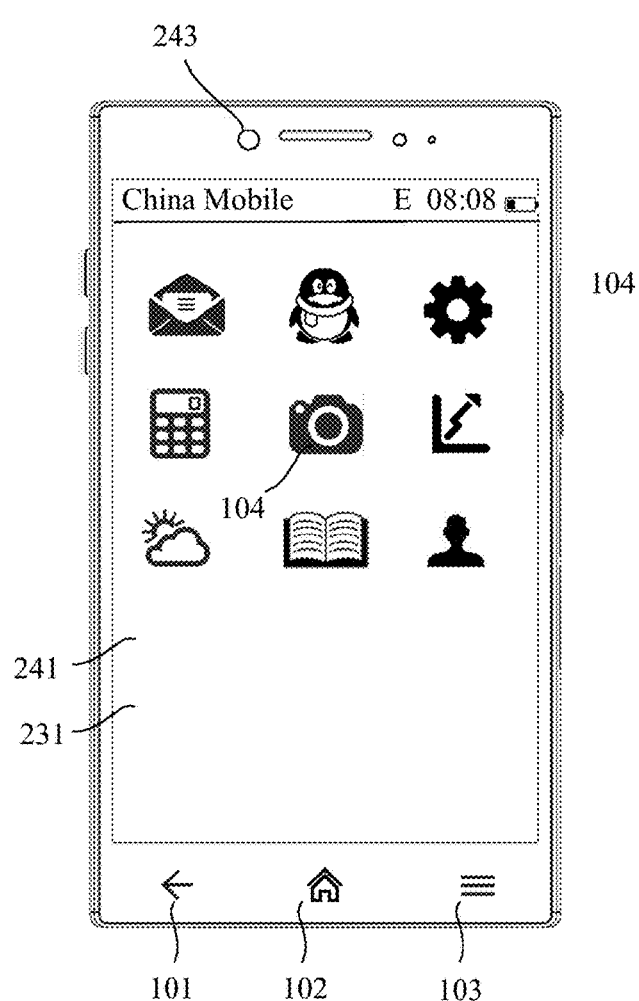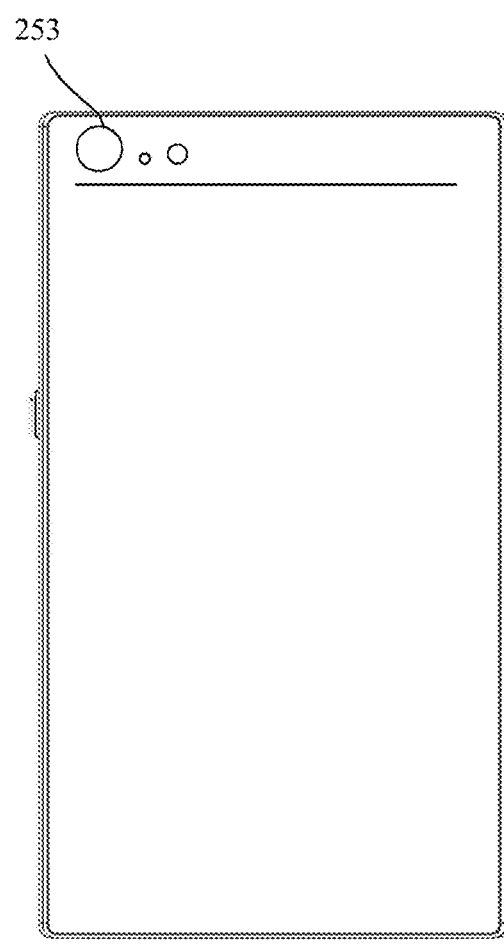
FIG. 1A    FIG. 1B
FIG. 1

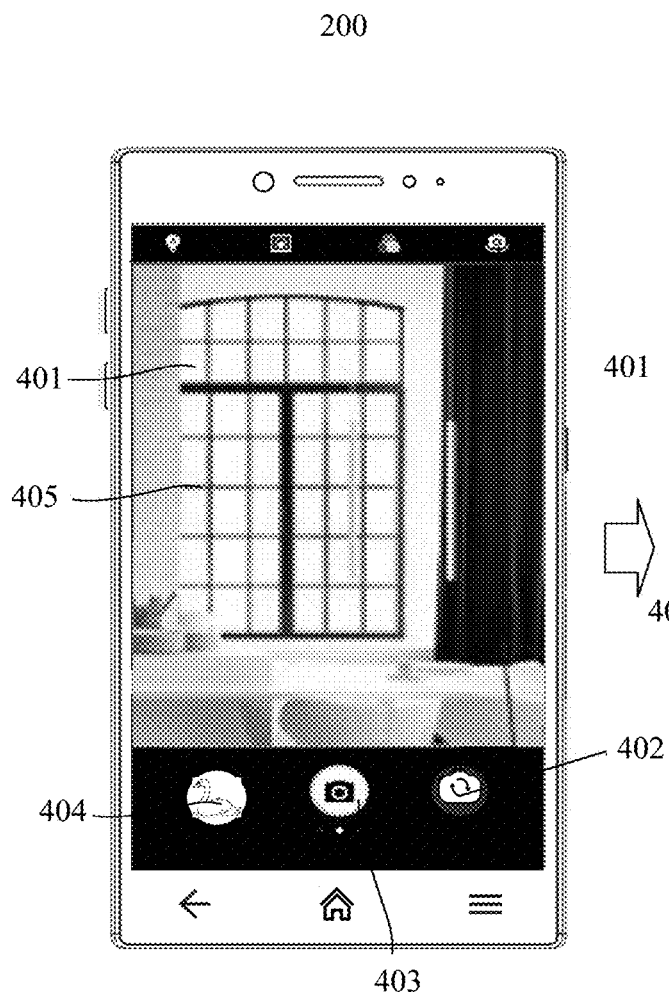
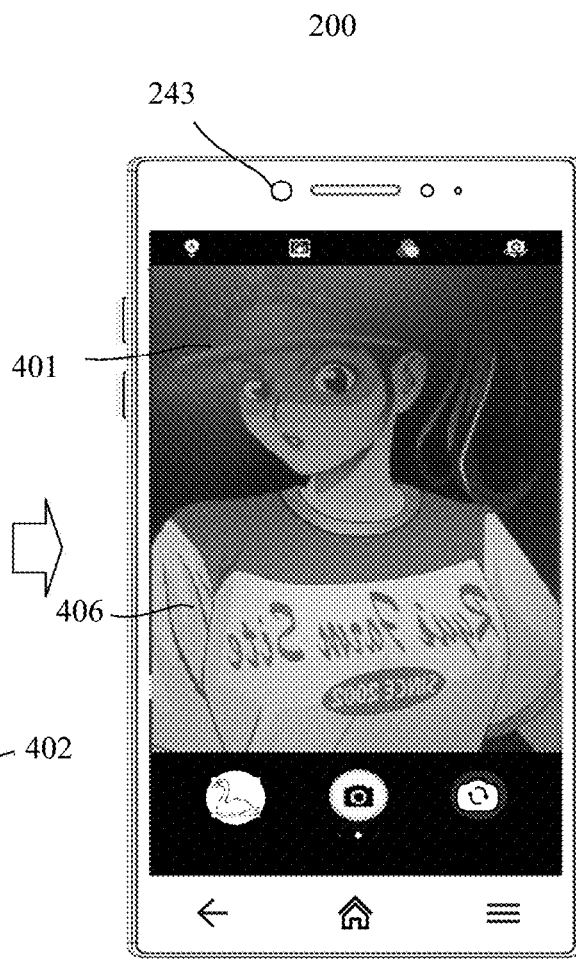
FIG. 4A  FIG. 4B
FIG. 4

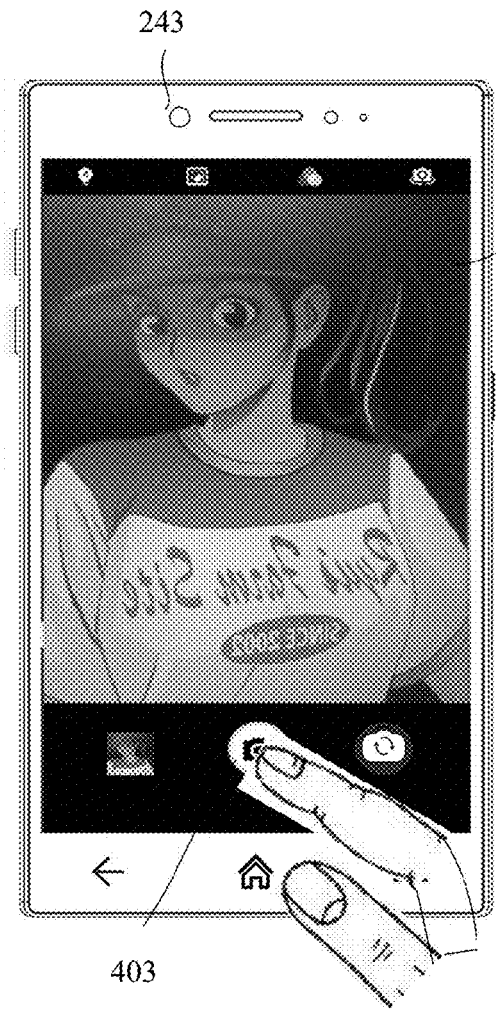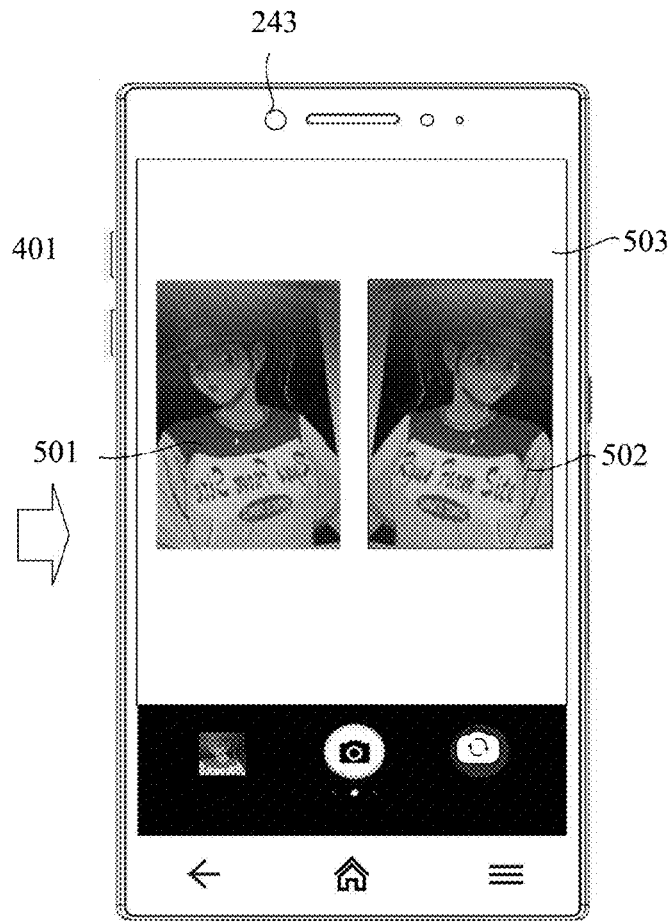
FIG. 5A  FIG. 5B
FIG. 5

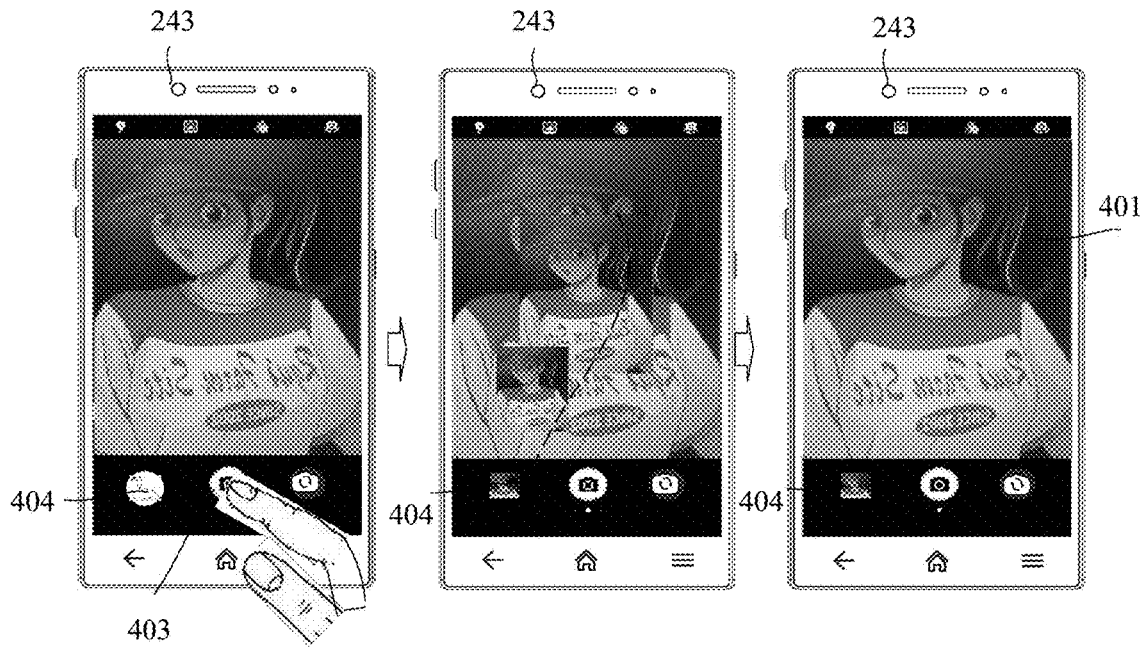
FIG. 6A    FIG. 6B    FIG. 6C
FIG. 6
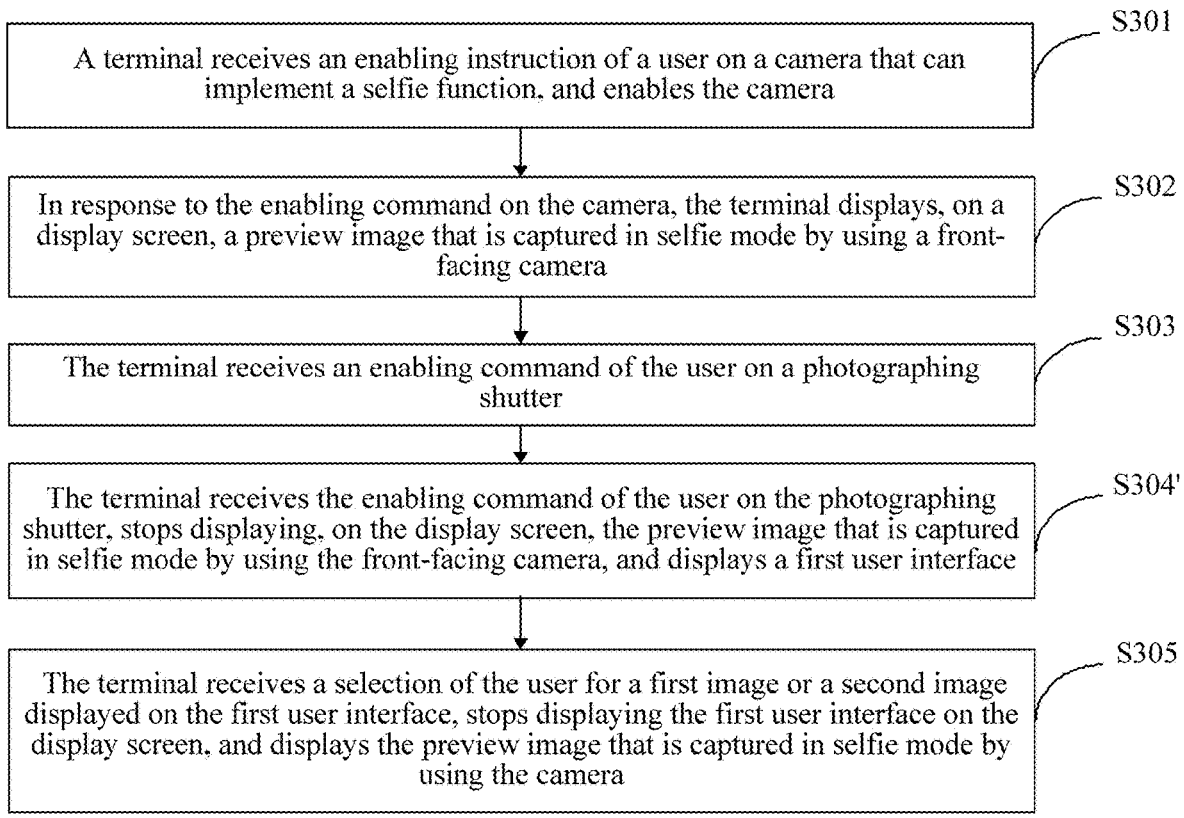
FIG. 7

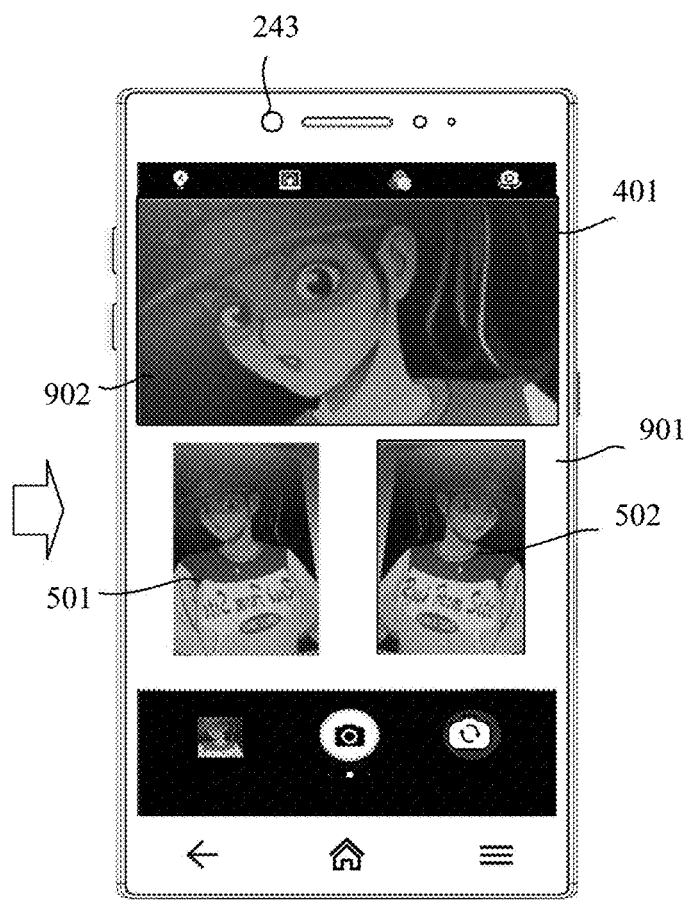
FIG. 9A  FIG. 9B
FIG. 9

FIG. 10A
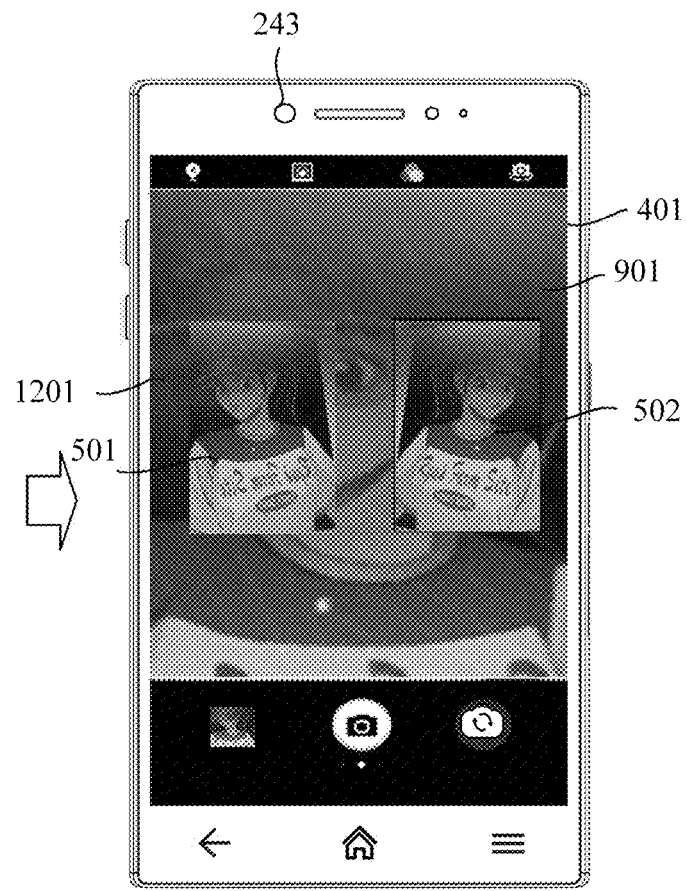
FIG. 10B
FIG. 10

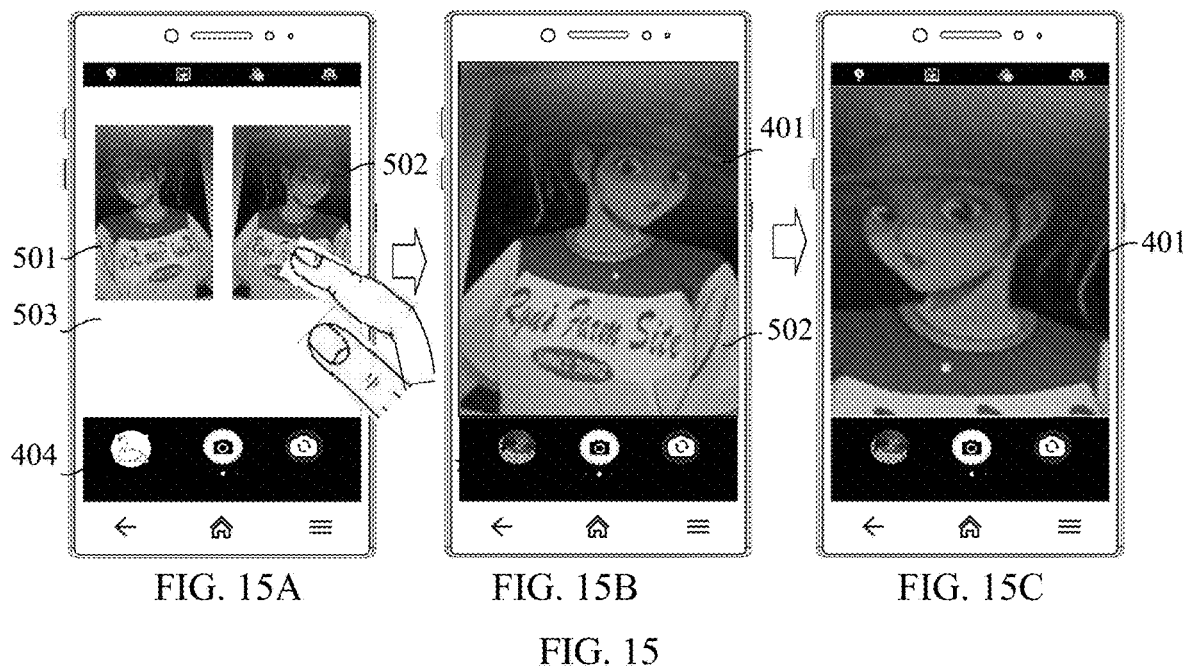
FIG. 15A   FIG. 15B   FIG. 15C
FIG. 15
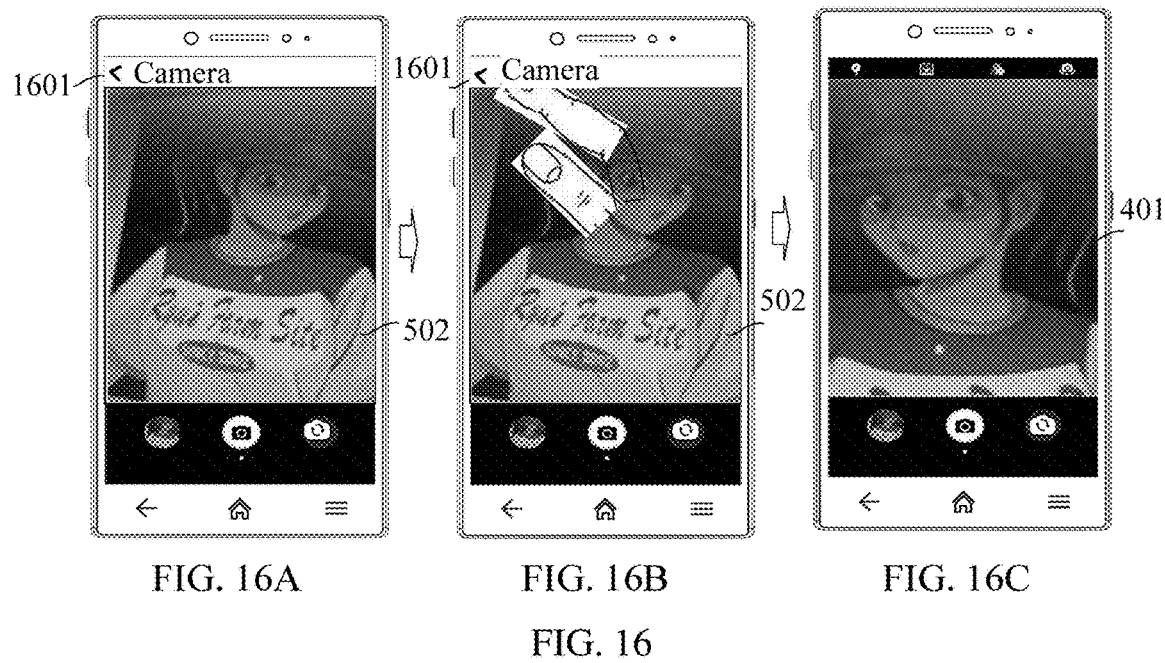
FIG. 16A   FIG. 16B   FIG. 16C
FIG. 16

PHOTOGRAPHING METHOD AND TERMINAL

CROSS-REFERENCE TO RELATED APPLICATIONS

The application is a national stage of International Application No. PCT/CN2017/083337, filed on May 5, 2017, which claims priority to Chinese Patent Application No. 201710142098.8, filed on Mar. 10, 2017. Both of the aforementioned applications are hereby incorporated by reference in their entireties.

TECHNICAL FIELD

Embodiments of the present disclosure relate to the field of terminal technologies, and in particular, to a photographing method and a terminal.

BACKGROUND

With social progress and improvement of living standards of people, more people choose to record everything in life by using selfies. To help a user take a selfie, currently, terminals such as mobile phones and tablet computers on the market are usually equipped with front-facing cameras.

In the prior art, when a terminal performs photographing by using a front-facing camera (to be specific, a selfie is taken), a selfie image may have two states in the terminal. In a first state, the selfie image is directly stored without any processing. For example, the selfie image is taken in a mirror or non-mirror form during photographing, and is stored in a mirror or non-mirror form correspondingly during storage. In a second state, the selfie image is stored after being processed. For example, the selfie image is taken in a mirror or non-mirror form during photographing and is stored in a non-mirror or mirror form correspondingly during storage. When the selfie image needs to be displayed, the selfie image may be displayed in a form of the selfie image stored by the terminal (a mirror or a non-mirror form).

However, different users have varying requirements on selfie images. For example, there may be a difference between a mirror and a real appearance of a person, some users are accustomed to their reflections in a mirror (namely, mirrors of the users), and tend to store selfie images in a mirror form when taking selfies by using terminals; while some users prefer to record their true selves, and tend to store selfie images in a non-mirror form when taking selfies by using terminals. Therefore, when a selfie image stored by the terminal by default in "either" of a "processing and storing the selfie image in a mirror form" manner and a "processing and storing the selfie image in a non-mirror form" manner is displayed, because different users have varying requirements, a display result may not meet the requirements of the users.

SUMMARY

This application provides a photographing method and a terminal, to display a selfie image meeting a requirement of a user for the user, and improve user experience when the selfie image is displayed.

To achieve the foregoing objective, the following technical solutions are used in this application:

According to a first aspect, this application provides a photographing method, applied to a terminal including a front-facing camera, a rear-facing camera, and a touch display screen. The photographing method includes: detecting that the front-facing camera is enabled; displaying a preview image that is captured in selfie mode by using the front-facing camera; receiving an enabling command of a user on a photographing shutter, and displaying a first user interface, where the first user interface includes a first image and a second image that is a mirror of the first image, and the first image is obtained based on the preview image; and in response to a selection of the user for the first image or the second image on the first user interface, displaying an image selected from the first image and the second image.

In this application, after receiving the enabling command of the user on the photographing shutter, the terminal may display the first user interface including the first image obtained based on the preview image and the second image that is a mirror of the first image, for selection by the user; and then, may display the selected image in response to the selection of the user for the first image or the second image displayed on the first user interface. The selection of the user for the first image or the second image that is a mirror of the first image can actually reflect a preference of the user for a selfie mirror image or a selfie non-mirror image of the user and meet a requirement of the user. In addition, when a selfie image obtained by taking a selfie is subsequently displayed, a selfie image meeting a requirement of the user can be displayed, and user experience when the selfie image is displayed can be improved.

According to a second aspect, this application provides a photographing method, applied to a terminal including a camera and a display screen. The photographing method includes: receiving an enabling command of a user on the camera; in response to the enabling command on the camera, displaying, on the display screen, a preview image that is captured in selfie mode by using the camera; displaying a first user interface on the display screen after receiving an enabling command of the user on a photographing shutter, where the first user interface includes a first image and a second image that is a mirror of the first image, and the first image is obtained based on the preview image; and receiving a selection of the user for the first image or the second image on the first user interface, stopping displaying the first user interface on the display screen, and displaying the preview image that is captured in selfie mode by using the camera.

In this application, after receiving the enabling command of the user on the photographing shutter, the terminal may display the first user interface including the first image obtained based on the preview image and the second image that is a mirror of the first image; and then, may receive the selection of the user for the first image or the second image displayed on the first user interface, stop displaying the first user interface on the display screen, and display the preview image that is captured in selfie mode by using the camera. The selection of the user for the first image or the second image that is a mirror of the first image can actually reflect a preference of the user for a selfie mirror image or a selfie non-mirror image of the user and meet a requirement of the user. In addition, when a selfie image obtained by taking a selfie is subsequently displayed, a selfie image meeting a requirement of the user can be displayed, and user experience when the selfie image is displayed can be improved.

In addition, in this application, after receiving the selection of the user for the first image or the second image displayed on the first user interface, the terminal may stop displaying the first user interface, and continue to display the preview image that is captured in selfie mode by using the camera, so that the terminal can continue to be in selfie mode and provide a selfie service to the user.

With reference to the first aspect or the second aspect, in a possible implementation, the "receiving an enabling command of a user on a photographing shutter, and displaying a first user interface" according to the first aspect or the "displaying a first user interface on the display screen after receiving an enabling command of the user on a photographing shutter" according to the second aspect specifically includes: "receiving the enabling command of the user on the photographing shutter, stopping displaying the preview image that is captured in selfie mode by using the front-facing camera, and displaying the first user interface". Normally, the terminal receives the enabling command of the user on the photographing shutter, and may store, in an album of the terminal, one or more preview images that are captured after the terminal receives the enabling command, and then continue to display the preview image that is captured in selfie mode by using the front-facing camera. However, in this application, when receiving the enabling command of the user on the photographing shutter, the terminal may stop displaying the preview image that is captured in selfie mode by using the front-facing camera, and instead, display the first user interface including the first image and the second image that are mirrors of each other, to provide a mirror image and a non-mirror image of a selfie image captured by the terminal to the user, for selection by the user.

With reference to the first aspect or the second aspect, in a second possible implementation, the first user interface further includes the preview image that is captured in selfie mode by using the camera (such as the front-facing camera). In this application, "the preview image that is captured in selfie mode by using the front-facing camera" and "the first image and the second image that are mirrors of each other" may further be displayed on the first user interface at the same time. On the first user interface, "the preview image that is captured in selfie mode by using the front-facing camera" and "the first image and the second image that are mirrors of each other" may be displayed in different areas, or "the preview image that is captured in selfie mode by using the front-facing camera" and "the first image and the second image that are mirrors of each other" may be displayed on different layers. For example, "the preview image that is captured in selfie mode by using the front-facing camera" may be displayed on a background layer of the first user interface, and the first image and the second image that are mirrors of each other may be displayed on a previous layer of the background layer. In this way, the user may be informed that currently, it is still in photographing mode, and once the user selects the first image or the second image, a photographing screen can be returned to, to provide convenience for a user operation.

With reference to any one of the first aspect or the possible implementations of the first aspect, in another possible implementation, the method in this application may further include: after first preset duration starting from a first moment, displaying the preview image that is captured in selfie mode by using the front-facing camera. The first moment is a moment at which an image selected from the first image and the second image starts to be displayed in response to the selection of the user for the first image or the second image displayed on the first user interface. After the first preset duration starting from the first moment, the terminal already enters the first user interface for the first preset duration. In this case, the terminal may automatically display the preview image that is captured in selfie mode by using the front-facing camera, so that the user can continue to take a selfie.

With reference to any one of the second aspect or the possible implementations of the second aspect, the "receiving a selection of the user for the first image or the second image on the first user interface, stopping displaying the first user interface on the display screen, and displaying the preview image that is captured in selfie mode by using the camera" may include: receiving the selection of the user for the first image or the second image displayed on the first user interface, stopping displaying the first user interface on the display screen, and displaying the selected image; and after duration for which the selected image is displayed on the display screen reaches first preset duration, stopping displaying the selected image on the display screen, and displaying the preview image that is captured in selfie mode by using the camera. After the duration for which the selected image is displayed on the display screen reaches the first preset duration, the terminal may automatically display the preview image that is captured in selfie mode by using the front-facing camera, so that the user can continue to take a selfie.

With reference to any one of the first aspect, the second aspect, or the foregoing possible implementations, in another possible implementation, before the displaying a first user interface, the method in this application may further include: using a preview image that is captured after the enabling command is received, as the first image, and determining whether the first image includes a text. Correspondingly, the "displaying a first user interface" may include: displaying the first user interface if the first image includes a text.

If the first image includes a text, the second image that is a mirror of the first image includes a text that is a mirror of a real text. It may be difficult to identify the text that is a mirror of the real text, causing inconvenience to the user. Therefore, when the first image includes a text, the terminal performs automatic identification and automatically enables a selection screen, and provides contrast display of a mirror and a non-mirror. Even a user that does not understand existence of a selfie mirror phenomenon can find a difference between the two images and make a choice, thereby helping the user, and improving intelligence of human-computer interaction.

With reference to any one of the first aspect, the second aspect, or the foregoing possible implementations, in another possible implementation, before the displaying a first user interface, the method in this application may further include: determining that a selfie mirror switch of the terminal is in a system default state. The system default state may be a state corresponding to a factory default of the selfie mirror switch of the terminal. That the selfie mirror switch is in the system default state may be that the selfie mirror switch has never been set, to be specific, the user never sets the selfie mirror switch in the terminal. Such a user may not understand a mirror function or may not know how to set a mirror function or may not know a location of a setting menu. In embodiments of the present disclosure, after a selfie is taken, a mirror image and a non-mirror image are directly provided for selection, thereby greatly helping such a user.

With reference to any one of the first aspect, the second aspect, or the foregoing possible implementations, in another possible implementation, the method in this application may further include: receiving the selection of the user for the first image or the second image on the first user interface, and storing the image selected from the first image and the second image. In response to the selection of the user, the terminal may store the image selected by the user.

With reference to any one of the first aspect, the second aspect, or the foregoing possible implementations, in another possible implementation, the user may not select, in time due to some unexpected situations, the first image or the second image displayed by the terminal on the first user interface. In this case, the method in this application may further include: if the selection of the user for the first image or the second image is not received within second preset duration, stopping displaying the first user interface on the display screen, displaying the preview image that is captured in selfie mode by using the camera, and storing the first image and/or the second image. If the terminal still does not receive the selection of the user for the first image or the second image after a time for which the first user interface is displayed reaches the second preset duration, the terminal may store either of the first image and the second image, or may store both the first image and the second image.

With reference to any one of the second aspect or the possible implementations of the second aspect, in another possible implementation, the "displaying a first user interface on the display screen after receiving an enabling command of the user on a photographing shutter" may include: after receiving the enabling command of the user on the photographing shutter, generating and storing the first image and the second image, and displaying the first user interface on the display screen. The terminal may store the first image and the second image before displaying the first user interface including the first image and the second image.

With reference to any one of the second aspect or the possible implementations of the second aspect, in another possible implementation, the method in this application may further include: receiving the selection of the user for the first image or the second image on the first user interface, and deleting an image that is not selected from the first image and the second image. In response to the selection of the user for the first image or the second image on the first user interface, the terminal may delete the image that is not selected by the user from the first image and the second image that are already stored.

With reference to any one of the first aspect, the second aspect, or the foregoing possible implementations, in another possible implementation, the user may not select, in time due to some unexpected situations, the first image or the second image displayed by the terminal on the first user interface. In this case, the method in this application may further include: if the selection of the user for the first image or the second image is not received within second preset duration, stopping displaying the first user interface on the display screen, displaying the preview image that is captured in selfie mode by using the camera, and deleting the first image or the second image.

With reference to any one of the first aspect, the second aspect, or the foregoing possible implementations, in another possible implementation, the method in this application may further include: in response to the selection of the user for the first image or the second image displayed on the first user interface, if the selected image is a selfie mirror image, setting the selfie mirror switch of the terminal to an enabled state; or if the selected image is a selfie non-mirror image, setting the selfie mirror switch of the terminal to a disabled state. The first image is the selfie mirror image, and the second image is the selfie non-mirror image; or the first image is the selfie non-mirror image, and the second image is the selfie mirror image. In this implementation, in response to the selection of the user for the first image or the second image, the terminal may automatically set the selfie mirror switch of the terminal, so that user operations when the user manually sets the selfie mirror switch can be reduced, thereby improving operation efficiency.

With reference to any one of the first aspect, the second aspect, or the foregoing possible implementations, in another possible implementation, the method in this application may further include: displaying mirror prompt information on the first user interface, where the mirror prompt information includes at least one of first prompt information, second prompt information, and third prompt information. The first prompt information is used to prompt the user to select an image that the user intends to store from the first image and the second image. The second prompt information is used to indicate a selfie mirror image and a selfie non-mirror image in the first image and the second image. The third prompt information is used to indicate a setting manner of the selfie mirror switch of the terminal.

It may be understood that, the first prompt information displayed by the terminal helps the user clarify that: the first image and the second image on the first user interface displayed by the terminal are provided for the user to select an image that the user intends to store. The second prompt information displayed by the terminal helps the user clarify which one of the first image and the second image displayed by the terminal is the selfie mirror image, and which one of the first image and the second image displayed by the terminal is the selfie non-mirror image, so that the user can be prevented from incorrectly selecting the selfie mirror image or the selfie non-mirror image. Some users may not know how to set the selfie mirror switch, and the third prompt information displayed by the terminal helps the users clarify a setting manner of the selfie mirror switch.

With reference to any one of the first aspect, the second aspect, or the foregoing possible implementations, in another possible implementation, a requirement of the user may change, for example, the user stores a selfie mirror image (such as the first image) when taking a selfie, but when viewing the selfie mirror image subsequently, the user intends to store a selfie non-mirror image (such as the second image that is a mirror of the first image). To adapt to the change in the requirement of the user, the method in this application may further include: when the selected image is displayed, in response to a mirror transformation command of the user, displaying an image that is a mirror of the selected image.

According to a third aspect, this application provides a terminal. The terminal is a terminal including a camera (such as a front-facing camera) and a display screen. The terminal may include a first receiving module, a display control module, a second receiving module, and a third receiving module. The first receiving module is configured to receive an enabling command of a user on the camera. The display control module is configured to: in response to the enabling command on the camera, display, on the display screen, a preview image that is captured in selfie mode by using the camera. The second receiving module is configured to receive an enabling command of the user on a photographing shutter. The display control module is configured to display a first user interface on the display screen after the second receiving module receives the enabling command of the user on the photographing shutter, where the first user interface includes a first image and a second image that is a mirror of the first image, and the first image is obtained based on the preview image. The third receiving module is configured to receive a selection of the user for the first image or the second image on the first user interface. The display module is further configured to: after the third receiving module receives the selection of the user for the first image or the second image on the first user interface, stop displaying the first user interface on the display screen, and display the preview image that is captured in selfie mode by using the camera.

With reference to the third aspect, in a first possible implementation, that "the display control module is configured to display a first user interface on the display screen after the enabling command of the user on the photographing shutter is received" may specifically include: the display control module is configured to: after the enabling command of the user on the photographing shutter is received, stop displaying, on the display screen, the preview image that is captured in selfie mode by using the camera, and display the first user interface.

With reference to the third aspect, in a second possible implementation, the first user interface further includes a preview image that is captured in selfie mode by using the front-facing camera.

With reference to any one of the third aspect or the foregoing possible implementations, in a third possible implementation, that "the display control module is configured to: after the selection of the user for the first image or the second image on the first user interface is received, stop displaying the first user interface on the display screen, and display the preview image that is captured in selfie mode by using the camera" may specifically include: after the selection of the user for the first image or the second image displayed on the first user interface is received, stopping displaying the first user interface on the display screen, and displaying a selected image; and after duration for which the selected image is displayed on the display screen reaches first preset duration, stopping displaying the selected image on the display screen, and displaying the preview image that is captured in selfie mode by using the camera.

With reference to any one of the third aspect or the foregoing possible implementations, in a fourth possible implementation, the terminal may further include a first judging module. The first judging module is configured to: before the display control module displays the first user interface on the display screen, determine whether the first image includes a text, where the first image is a preview image captured by using the camera after the receiving module receives the enabling command. The display control module is specifically configured to display the first user interface on the display screen if the first judging module determines that the first image includes a text.

With reference to any one of the third aspect or the foregoing possible implementations, in a fifth possible implementation, the terminal may further include a second judging module. The second judging module is configured to: before the display control module displays the first user interface on the display screen, determine that a selfie mirror switch of the terminal is in a system default state.

With reference to any one of the third aspect or the foregoing possible implementations, in a sixth possible implementation, the terminal may further include a storage module, configured to: after the third receiving module receives the selection of the user for the first image or the second image on the first user interface, store an image selected from the first image and the second image.

With reference to any one of the third aspect or the foregoing possible implementations, in a seventh possible implementation, the display control module is further configured to: after displaying the first user interface on the display screen, if the selection of the user for the first image or the second image is not received within second preset duration, stop displaying the first user interface on the display screen, and display the preview image that is captured in selfie mode by using the camera. The storage module is further configured to: if the selection of the user for the first image or the second image is not received within the second preset duration, store the first image and/or the second image.

With reference to any one of the third aspect or the first to the fifth possible implementations, in an eighth possible implementation, the storage module is further configured to: after the receiving module receives the enabling command of the user on the photographing shutter, store the first image and the second image.

With reference to the eighth possible implementation of the third aspect, in a ninth possible implementation, the terminal further includes a deletion module, configured to: after the third receiving module receives the selection of the user for the first image or the second image on the first user interface, delete an image that is not selected from the first image and the second image.

With reference to the ninth possible implementation of the third aspect, in a tenth possible implementation, the display control module is further configured to: if the receiving module does not receive the selection of the user for the first image or the second image within second preset duration, stop displaying the first user interface on the display screen, and display the preview image that is captured in selfie mode by using the camera. The deletion module is configured to: if the receiving module does not receive the selection of the user for the first image or the second image within the second preset duration, delete the first image or the second image.

With reference to any one of the third aspect or the foregoing possible implementations, in an eleventh possible implementation, the terminal may further include a setting module. The setting module is configured to: if the selected image is a selfie mirror, set the selfie mirror switch of the terminal to an enabled state.

With reference to any one of the third aspect or the foregoing possible implementations, in a twelfth possible implementation, the setting module may further be configured to: if the selected image is a selfie non-mirror image, set the selfie mirror switch of the terminal to a disabled state.

With reference to any one of the third aspect or the foregoing possible implementations, in a thirteenth possible implementation, the terminal may further include a mirror transformation module. The mirror transformation module is configured to: when the selected image is displayed on the display screen, in response to a mirror transformation command entered by the user, transform the selected image into an image that is a mirror of the selected image. The display control module is configured to display, on the display screen, the image that is obtained through transformation by the mirror transformation module and that is a mirror of the selected image.

According to a fourth aspect, this application provides a terminal. The terminal includes a camera, a display screen, and one or more processors. The one or more processors are configured to: receive an enabling command of a user on the camera; in response to the enabling command on the camera, instruct to display, on the display screen, a preview image that is captured in selfie mode by using the camera; instruct to display a first user interface on the display screen after receiving an enabling command of the user on a photographing shutter, where the first user interface includes a first image and a second image that is a mirror of the first image, and the first image is obtained based on the preview image;

and receive a selection of the user for the first image or the second image on the first user interface, instruct to stop displaying the first user interface on the display screen, and display the preview image that is captured in selfie mode by using the camera. The display screen is configured to display specified content according to a command of the processor.

With reference to the fourth aspect, in a first possible implementation, that "the one or more processors are configured to instruct to display a first user interface on the display screen after receiving an enabling command of the user on a photographing shutter" specifically includes: the one or more processors are configured to: after receiving the enabling command of the user on the photographing shutter, instruct to stop displaying, on the display screen, the preview image that is captured in selfie mode by using the camera, and display the first user interface.

With reference to the fourth aspect, in a second possible implementation, the first user interface further includes a preview image that is captured in selfie mode by using the front-facing camera.

With reference to any one of the fourth aspect or the foregoing possible implementations, in a third possible implementation, that "the one or more processors are configured to: receive the selection of the user for the first image or the second image on the first user interface, instruct to stop displaying the first user interface on the display screen, and display the preview image that is captured in selfie mode by using the camera" specifically includes: the one or more processors are configured to: receive the selection of the user for the first image or the second image displayed on the first user interface, instruct to stop displaying the first user interface on the display screen, and display a selected image; and after duration for which the selected image is displayed on the display screen reaches first preset duration, instruct to stop displaying the selected image on the display screen, and display the preview image that is captured in selfie mode by using the camera.

With reference to any one of the fourth aspect or the foregoing possible implementations, in a fourth possible implementation, the one or more processors are further configured to: before instructing to display the first user interface on the display screen, use a preview image that is captured after the enabling command is received, as the first image, and determine whether the first image includes a text. That "the one or more processors are configured to instruct to display a first user interface on the display screen" includes: the one or more processors are configured to instruct to display the first user interface on the display screen if the first image includes a text.

With reference to any one of the fourth aspect or the foregoing possible implementations, in a fifth possible implementation, the one or more processors are further configured to: before instructing to display the first user interface on the display screen, determine that a selfie mirror switch of the terminal is in a system default state.

With reference to any one of the fourth aspect or the foregoing possible implementations, in a sixth possible implementation, the terminal further includes a memory. The one or more processors are further configured to: receive the selection of the user for the first image or the second image on the first user interface, and instruct the memory to store an image selected from the first image and the second image.

With reference to any one of the fourth aspect or the foregoing possible implementations, in a seventh possible implementation, the one or more processors are further configured to: if the selection of the user for the first image or the second image is not received within second preset duration, instruct to stop displaying the first user interface on the display screen, display the preview image that is captured in selfie mode by using the camera, and instruct the memory to store the first image and/or the second image.

With reference to any one of the fourth aspect or the foregoing possible implementations, in an eighth possible implementation, that "the one or more processors are configured to instruct to display a first user interface on the display screen after receiving an enabling command of the user on a photographing shutter" includes: the one or more processors are configured to: after receiving the enabling command of the user on the photographing shutter, generate the first image and the second image, instruct the memory to store the first image and the second image, and instruct to display the first user interface on the display screen.

With reference to the eighth possible implementation of the fourth aspect, in a ninth possible implementation, the one or more processors are further configured to: receive the selection of the user for the first image or the second image on the first user interface, and delete an image that is not selected from the first image and the second image.

With reference to the eighth possible implementation of the fourth aspect, in a tenth possible implementation, the one or more processors are further configured to: after instructing to display the first user interface on the display screen, if the selection of the user for the first image or the second image is not received within second preset duration, stop displaying the first user interface on the display screen, display the preview image that is captured in selfie mode by using the camera, and delete the first image or the second image.

With reference to any one of the fourth aspect or the foregoing possible implementations, in an eleventh possible implementation, the one or more processors are further configured to: if the selected image is a selfie mirror, set the selfie mirror switch of the terminal to an enabled state.

With reference to any one of the fourth aspect or the foregoing possible implementations, in a twelfth possible implementation, the one or more processors are further configured to: if the selected image is a selfie non-mirror image, set the selfie mirror switch of the terminal to a disabled state.

With reference to any one of the fourth aspect or the foregoing possible implementations, in a thirteenth possible implementation, the one or more processors are further configured to: when the selected image is displayed on the display screen, in response to a mirror transformation command entered by the user, instruct to display, on the display screen, an image that is a mirror of the selected image.

It should be noted that, for detailed descriptions of the first image, the second image, the first preset duration, the second preset duration, the first prompt information, the second prompt information, the third prompt information, and the like in any one of the third aspect, the fourth aspect, or the possible implementations of the third aspect or the fourth aspect in this application, refer to detailed descriptions in any one of the first aspect, the second aspect, or the possible implementations of the first aspect and the second aspect, and details are not described herein again in the embodiments of the present disclosure.

According to a fifth aspect, this application further provides a computer storage medium. The computer storage medium stores computer program code, and the computer program code is used to perform the photographing method according to any one of the first aspect, the second aspect, or the possible implementations of the first aspect and the second aspect in this application.

According to a sixth aspect, this application further provides a computer program product. When the computer program product is run on a computer, the computer is enabled to perform the photographing method according to any one of the first aspect, the second aspect, or the possible implementations of the first aspect and the second aspect in this application.

It may be understood that, the terminal according to the third aspect or the fourth aspect, the computer storage medium according to the fifth aspect, or the computer program product according to the sixth aspect that is provided above is configured to perform the corresponding method provided above. Therefore, for beneficial effects that can be achieved by the terminal, the computer storage medium, or the computer program product, refer to beneficial effects of the corresponding method provided above, and details are not described herein again.

BRIEF DESCRIPTION OF DRAWINGS

FIG. 1 is a schematic diagram of an example of a screen of a mobile phone according to an embodiment of the present disclosure;

FIG. 4 is a first schematic diagram of an example of a selfie screen of a terminal according to an embodiment of the present disclosure;

FIG. 5 is a second schematic diagram of an example of a selfie screen of a terminal according to an embodiment of the present disclosure;

FIG. 6 is a third schematic diagram of an example of a selfie screen of a terminal according to an embodiment of the present disclosure;

FIG. 7 is a second flowchart of a photographing method according to an embodiment of the present disclosure;

FIG. 9 is a fourth schematic diagram of an example of a selfie screen of a terminal according to an embodiment of the present disclosure;

FIG. 10 is a fifth schematic diagram of an example of a selfie screen of a terminal according to an embodiment of the present disclosure;

FIG. 15 is a seventh schematic diagram of an example of a selfie screen of a terminal according to an embodiment of the present disclosure;

FIG. 16 is an eighth schematic diagram of an example of a selfie screen of a terminal according to an embodiment of the present disclosure;

DESCRIPTION OF EMBODIMENTS

Embodiments of the present disclosure provide a photographing method, applicable to a terminal equipped with a camera and a display screen, and specifically applicable to a process of capturing an image by the terminal by using the camera (such as a front-facing camera), and displaying the captured image (selfie mode for short). Usually, in selfie mode, an image is captured by using the front-facing camera to take a selfie. In such a mode, an object to be photographed is usually a photographer. In the embodiments of the present disclosure, in selfie mode, that a selfie is taken in a manner (for example, a method such as rotation of the camera or optical reflection) by using a rear-facing camera is not ruled out, so that a preview image in selfie mode may be captured by using the rear-facing camera. Only the front-facing camera is used as an example below.

For example, the terminal in the embodiments of the present disclosure may be various devices equipped with a camera (such as a front-facing camera). For example, the terminal may be a wearable electronic device (such as a smartwatch) or a Polaroid camera, or may be a mobile phone 200 shown in FIG. 1 or FIG. 2, or may be a tablet computer, a desktop computer, a virtual reality apparatus, or an augmented reality apparatus. A specific form of the terminal is not particularly limited in the embodiments of the present disclosure.

Figure 2:
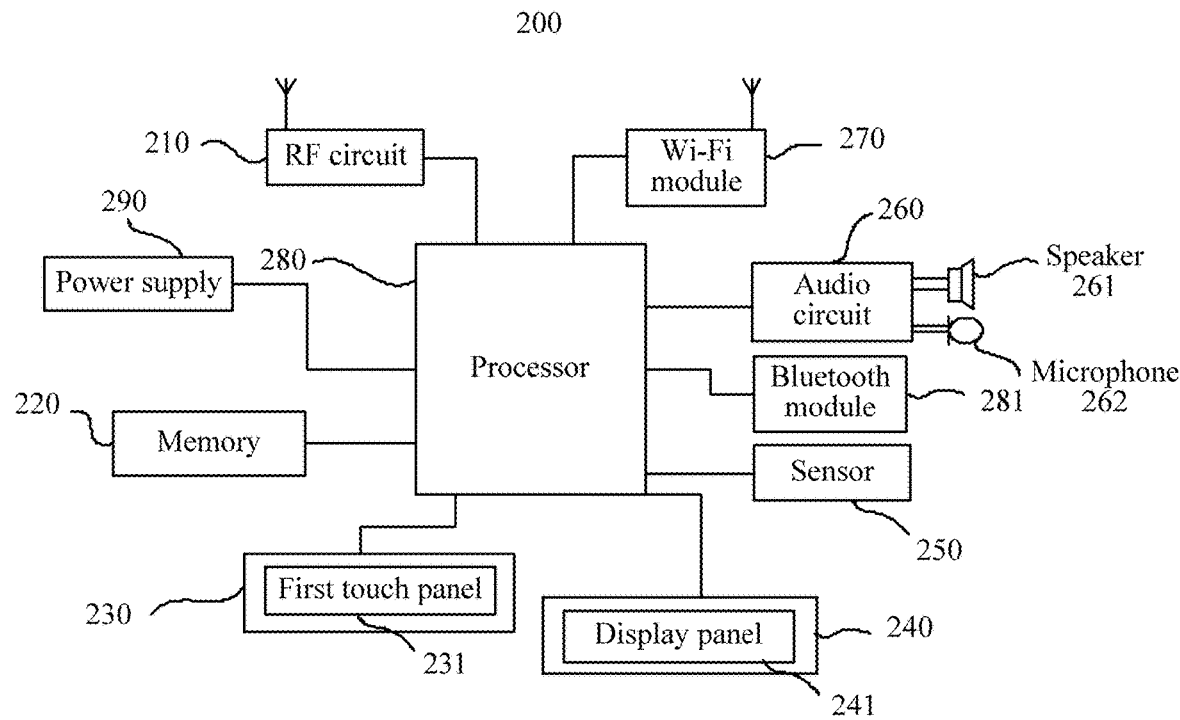
FIG. 2 is a schematic diagram of a hardware structure of a mobile phone according to an embodiment of the present disclosure.

A mobile phone is used as an example in the following embodiment to describe how the terminal implements specific technical solutions in the embodiments. As shown in FIG. 1 or FIG. 2, a mobile device in this embodiment may be the mobile phone 200. FIG. 1A and FIG. 1B are schematic diagrams of an appearance of the mobile phone 200. FIG. 1A is a schematic front view of the mobile phone 200, and FIG. 1B is a schematic rear view of the mobile phone 200. The mobile phone 200 is used as an example below to describe this embodiment in detail.

It should be understood that, the mobile phone 200 shown in the figure is merely an example of the terminal, and the mobile phone 200 may include more components or fewer components than those shown in the figure, or two or more components may be combined, or a different component deployment may be used. The components shown in FIG. 2 may be implemented by hardware that includes one or more signal processors and/or application-specific integrated circuits, software, or a combination of hardware and software.

As shown in FIG. 2, the mobile phone 200 includes components such as a radio frequency (RF) circuit 210, a memory 220, an input unit 230, a display unit 240, a sensor 250, an audio circuit 260, a Wireless Fidelity (Wi-Fi) module 270, a processor 280, and a power supply 290. A person skilled in the art may understand that a structure of the mobile phone shown in FIG. 2 does not constitute a limitation on the mobile phone, and the mobile phone may include more components or fewer components than those shown in the figure, or some components may be combined, or a different component deployment may be used.

The following specifically describes each component of the mobile phone 200 with reference to FIG. 2:

The RF circuit 210 may be configured to receive and send a signal in an information receiving and sending process or a call process, may receive downlink information from a base station, then deliver the downlink information to the processor 280 for processing, and additionally, send related uplink data to the base station. Generally, the RF circuit includes, but is not limited to, devices such as an antenna, at least one amplifier, a transceiver, a coupler, a low noise amplifier, and a duplexer. In addition, the RF circuit 210 may communicate with a network and another mobile device through wireless communication. The wireless communication may use any communication standard or protocol, including, but not limited to, a Global System for Mobile Communications, a general packet radio service, Code Division Multiple Access, Wideband Code Division Multiple Access, Long Term Evolution, an email, a short message service, and the like.

The memory 220 may be configured to store a software program and data. The processor 280 runs the software program and the data stored in the memory 220, to perform various functions and data processing of the mobile phone 200. The memory 220 may mainly include a program storage area and a data storage area. The program storage area may store an operating system, an application program required by at least one function (such as a sound playback function and an image display function), and the like. The data storage area may store data (such as audio data and an address book) created based on use of the mobile phone 200, and the like. In addition, the memory 220 may include a high-speed random access memory, and may further include a non-volatile memory, such as at least one magnetic disk storage device, a flash memory, or other volatile solid-state storage devices. In the following embodiments, the memory 220 stores an operating system that can run on the mobile phone 200, for example, an iOS® operating system developed by Apple Inc, an Android® open source operating system developed by Google, or a Windows® operating system developed by Microsoft.

The input unit 230 (such as a touchscreen) may be configured to receive entered digit or character information, and generate a signal input related to a user setting and function control of the mobile phone 200. The input unit 230 may include a touch panel 231 disposed on a front surface of the mobile phone 200 and shown in FIG. 1, may collect a touch operation of a user on or close to the touch panel 231 (such as an operation of the user on or close to the touch panel 231 by using any suitable object or accessory such as a finger or a stylus), and drive a corresponding connection apparatus based on a preset program. Optionally, the touch panel 231 may include two parts: a touch detection apparatus and a touch controller (not shown in FIG. 2). The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 280. Moreover, the touch controller can receive and execute an instruction sent by the processor 280. In addition, the touch panel 231 may be implemented by using various types, such as a resistive type, a capacitance type, an infrared type, and a surface sound wave type.

The display unit 240 (namely, a display screen) may be configured to display information entered by the user or information provided to the user, and graphical user interfaces (GUI) of various menus of the mobile phone 200. The display unit 240 may include a display panel 241 disposed on the front surface of the mobile phone 200. The display panel 241 may be configured in a form of a liquid crystal display, an organic light-emitting diode, or the like.

As shown in FIG. 1A and FIG. 1B, in some embodiments, the mobile phone 200 may include a front surface A and a back surface B. Three optical touch keys 101, 102, and 103 are disposed at the bottom of the front surface A. The touch panel 231 and the display panel 241 are further disposed. The touch panel 231 covers the display panel 241. After detecting a touch operation on or close to the touch panel 231, the touch panel 231 transfers the touch operation to the processor 280, to determine a touch event. Subsequently, the processor 280 provides a corresponding visual output on the display panel 241 based on a type of the touch event. Although, in FIG. 2, the touch panel 231 and the display panel 241 are used as two separate parts to implement input and output functions of the mobile phone 200, in some embodiments, the touch panel 231 and the display panel 241 may be integrated to implement the input and output functions of the mobile phone 200. The integrated touch panel 231 and display panel 241 may be referred to as a touch display screen for short.

In some other embodiments, a pressure sensor may further be disposed on the touch panel 231. In this way, when the user performs a touch operation on the touch panel, the touch panel can further detect pressure of the touch operation, so that the mobile phone 200 can more accurately detect the touch operation.

The mobile phone 200 may further include at least one sensor 250 such as an optical sensor, a motion sensor, and other sensors. The optical sensor may include an ambient light sensor and a proximity sensor. As shown in FIG. 1A, the ambient light sensor 251 may adjust luminance of the display panel 241 based on luminance of ambient light. The proximity sensor 252 is disposed on the front surface of the mobile phone 200. When the mobile phone 200 moves to an ear, the mobile phone 200 switches off a power supply of the display panel 241 based on detection by the proximity optical sensor 252. In this way, electricity of the mobile phone 200 can further be saved. As one type of motion sensor, an accelerometer sensor may detect magnitude of acceleration in various directions (usually on three axes), may detect magnitude and a direction of the gravity when the mobile phone 200 is static, and is applicable to an application that recognizes a gesture of the mobile phone (for example, switching between landscape orientation and portrait orientation, a related game, and magnetometer gesture calibration), a function related to vibration recognition (such as a pedometer and a knock), and the like. For other sensors such as a gyroscope, a barometer, a hygrometer, a thermometer, and an infrared sensor that may further be configured for the mobile phone 200, details are not described herein. As shown in FIG. 1A, a front-facing camera 253 is disposed at the top of the front surface of the mobile phone 200, and a rear-facing camera 254 is disposed at the top of the back surface of the mobile phone 200. The front-facing camera 253 may use a selfie image when the mobile phone 200 performs the photographing method provided in the embodiments of the present disclosure.

The audio circuit 260, a speaker 261, and a microphone 262 may provide an audio interface between the user and the mobile phone 200. The audio circuit 260 may convert received audio data into an electrical signal and transmit the electrical signal to the speaker 261. The speaker 261 converts the electrical signal into a sound signal for output. On the other hand, the microphone 262 converts a collected sound signal into an electrical signal. The audio circuit 260 receives the electrical signal, converts the electrical signal into audio data, and then outputs the audio data to the RF circuit 210, to send the audio data to, for example, another mobile phone, or output the audio data to the memory 220 for further processing.

Wi-Fi is a short-distance wireless transmission technology. The mobile phone 200 may help, by using the Wi-Fi module 270, the user receive and send an email, browse a web page, access streaming media, and the like. Wi-Fi provides wireless broadband Internet access for the user.

The processor 280 is a control center of the mobile phone 200, and is connected to various parts of the mobile phone by using various interfaces and lines. The processor 280 performs various functions and data processing of the mobile phone 200 by running or executing the software program stored in the memory 220, and invoking the data stored in the memory 220, thereby performing overall monitoring on the mobile phone. In some embodiments, the processor 280 may include one or more processing units. The processor 280 may further integrate an application processor and a modem processor. The application processor mainly processes an operating system, a user interface, an application program, and the like. The modem processor mainly processes wireless communication. It may be understood that the foregoing modem processor may not be integrated into the processor 180.

A Bluetooth module 281 is configured to exchange information with another device by using such a short-distance communication protocol as Bluetooth. For example, the mobile phone 200 may establish, by using the Bluetooth module 281, a Bluetooth connection to a wearable electronic device (such as a smartwatch) also having a Bluetooth module, to exchange data.

The mobile phone 200 further includes the power supply 290 (such as a battery) for supplying power to the components. The power supply may be logically connected to the processor 280 by using a power management system, thereby implementing functions such as charging, discharging, and power consumption management by using the power management system. It may be understood that, in the following embodiments, the power supply 290 may be configured to supply power to the display panel 241 and the touch panel 231.

Methods in the following embodiments may all be implemented in the mobile phone 200 having the foregoing hardware structure.

Figure 3:
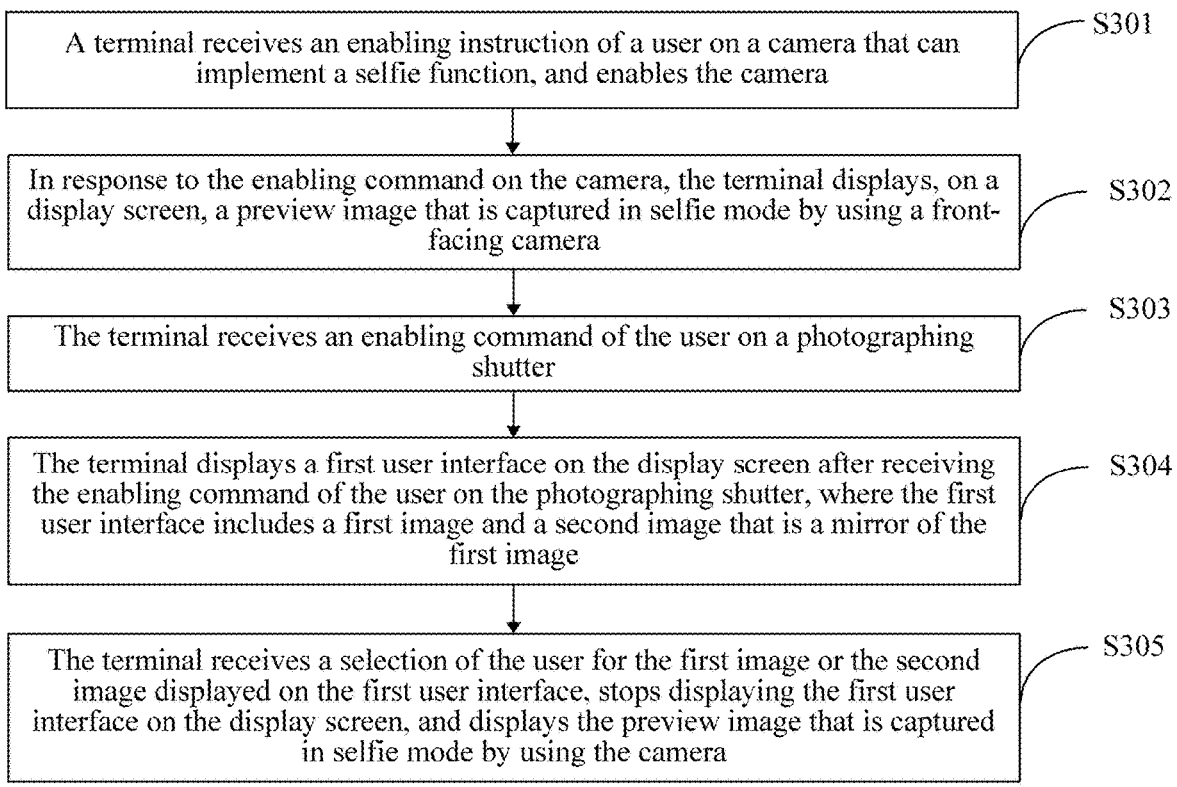
FIG. 3 is a first flowchart of a photographing method according to an embodiment of the present disclosure.

For example, in an embodiment of the present invention, an example in which a user X takes a selfie by using a terminal including a camera (such as a front-facing camera) and a touch display screen is used to describe a photographing method provided in this embodiment of the present disclosure. As shown in FIG. 3, the photographing method provided in this embodiment of the present disclosure may include S301 to S303.

S301: The terminal receives an enabling instruction of the user on the camera that can implement a selfie function, and enables the camera.

The selfie function is usually implemented by using the front-facing camera or may be implemented by using a rear-facing camera, or may be implemented by using an external camera coupled to the terminal.

S302: In response to the enabling command on the camera, the terminal displays, on the display screen, a preview image that is captured in selfie mode by using the front-facing camera.

Usually, a default camera of the terminal is the rear-facing camera. In this case, when a finger of the user X touches or approaches a "camera" icon 104 displayed on the display panel 241 shown in FIG. 1A, the touch panel 231 of the terminal 200 detects the touch event on or close to the touch panel 231, and transfers the touch event to the processor 280, to determine an instruction corresponding to the touch event. Subsequently, the processor 280 invokes, according to the instruction, an application program stored in the memory 220, and instructs the display panel 241 to display a GUI of the application program (the camera) shown in FIG. 4A, to help the user perform a specific operation. Alternatively, when detecting that a preset photographing shortcut key is pressed, the processor 280 of the terminal 200 may determine an instruction corresponding to the key pressing event. Subsequently, the processor 280 invokes, according to the instruction, an application program stored in the memory 220, and instructs the display panel 241 to display a GUI of the application program (the camera) shown in FIG. 4A, to help the user perform a specific operation.

A method for controlling, by the user, the terminal 200 to display the GUI shown in FIG. 4A includes, but is not limited to, the method described by way of example above. Details are not described herein in this embodiment of the present disclosure.

For example, the GUI of the application program "camera" shown in FIG. 4A may include a viewfinder frame 401, a camera switching key 402, a photographing key 403, and an album key 404.

The viewfinder frame 401 is used to display a preview image that is captured by using the rear-facing camera 253 or the front-facing camera 243 of the terminal 200. The camera switching key 402 is used to trigger the terminal 200 to switch between the front-facing camera 243 and the rear-facing camera 253 for use, to capture an image. The photographing key 403 is used to control the terminal 200 to store the preview image that is captured by using the rear-facing camera 253 or the front-facing camera 243 and that is displayed in the viewfinder frame 401. The album key 404 is used to view an image stored in the terminal 200.

When the default camera of the terminal is the rear-facing camera, a preview image 405 that is captured by using the rear-facing camera and that is shown in FIG. 4A may be displayed in the viewfinder frame 401.

Optionally, default cameras of some terminals are front-facing cameras. In this case, when the finger of the user X touches or approaches the "camera" icon 104 displayed on the display panel 241 shown in FIG. 1A, or when detecting that the preset photographing shortcut key is pressed, the processor 280 of the terminal 200 may display, on the display panel 241, a GUI that is in the viewfinder frame 401 and that includes a preview image captured by using the front-facing camera.

In this embodiment of the present disclosure, an example in which the default camera of the terminal is the rear-facing camera is used. When the finger of the user X touches or approaches the camera switching key 402 displayed on the display panel 241 shown in FIG. 4A, the touch panel 231 of the terminal 200 detects the touch event on or close to the touch panel 231, and transfers the touch event to the processor 280, to determine an instruction corresponding to the touch event. Subsequently, the processor 280 may enable the front-facing camera 243, start to use the front-facing camera 243 to capture a preview image, and display, in the viewfinder frame 401, a preview image 406 that is captured by using the front-facing camera 243. As shown in FIG. 4B, the preview image 406 displayed in the viewfinder frame 401 is a selfie mirror image of the user X.

For example, as shown in FIG. 4B, the preview image 406 (the selfie mirror image of the user X) displayed in the viewfinder frame 401 may be captured by using the front-facing camera 243 of the terminal 200, or may be obtained by performing mirroring on a non-mirror image that is captured by using the front-facing camera 243.

Optionally, the terminal 200 may display a selfie non-mirror image of the user X in the viewfinder frame 401. The selfie non-mirror image may be captured by using the front-facing camera 243; or the selfie non-mirror image may be obtained by performing mirroring on a mirror image that is captured by using the front-facing camera 243.

It should be noted that, in this embodiment of the present disclosure, the mirroring herein may include: performing mirroring on a selfie mirror image, to obtain a selfie non-mirror image, or performing mirroring on a selfie non-mirror image, to obtain a selfie mirror image. For a method for processing a selfie mirror image to obtain a selfie non-mirror image, and a method for processing a selfie non-mirror image to obtain a selfie mirror image, refer to detailed descriptions in the patent CN103152489B, and details are not described herein in this embodiment of the present disclosure.

In this embodiment of the present disclosure, an example in which the selfie mirror image of the user X is displayed in the viewfinder frame 401 is used herein to describe the selfie-taking method provided in this embodiment of the present disclosure.

S303: The terminal receives an enabling command of the user on a photographing shutter.

The enabling command of the user on the photographing shutter may be a tap operation command of the user on the photographing key 403 shown in FIG. 5A, or the enabling command may be an operation command of the user on a preset shortcut key used to trigger enabling of the photographing shutter. Alternatively, the enabling command may be a voice command, a gesture command, or the like. A specific implementation means is not limited in the present disclosure.

S304: The terminal displays a first user interface on the display screen after receiving the enabling command of the user on the photographing shutter, where the first user interface includes a first image and a second image that is a mirror of the first image.

The first image is obtained based on the preview image that is captured by using the camera.

For example, the first image may be a first preview image captured by using the camera after the terminal receives the enabling command, or the first image may be obtained by performing mirroring on the first preview image.

Alternatively, the first image may be any one of a plurality of preview images that are captured after the terminal receives the enabling command, or the first image may be obtained by performing mirroring on any one of the preview images.

Alternatively, the first image may be a preview image selected from a plurality of preview images that are captured by the terminal after the terminal receives the enabling command, or the first image may be obtained by performing mirroring on the selected preview images.

Further, the first image may include at least two of a plurality of preview images that are captured by using the camera after the terminal receives the enabling command, in other words, the first image may be a set of the at least two preview images; or the first image may include all images obtained by performing mirroring on the images in the set, in other words, the first image may be a set of all the images. The first image may be a plurality of continuously captured images or may be a video. For a case in which the first image is not a single image, refer to processing on a single image, and same processing is performed on each image.

For example, as shown in FIG. 5A or FIG. 6A, when the finger of the user X touches or approaches the displayed photographing key 403 of the camera on the display panel, the touch panel 231 of the terminal 200 detects the touch event on or close to the touch panel 231, and transfers the touch event to the processor 280, to determine an instruction (namely, the enabling command of the user on the photographing shutter) corresponding to the touch event. Subsequently, the processor 280 obtains, according to the instruction, a preview image that is captured by using the front-facing camera 243 when the user X touches the photographing key 403 (or after the user X touches the photographing key 403 for a preset time).

Usually, if the terminal detects the enabling command of the user on the photographing shutter (a command corresponding to a touch of the finger of the user on the photographing key 403, as shown in FIG. 6A), one or more preview images captured after the terminal detects the enabling command may be stored in an album of the terminal. The terminal may display a dynamic image along a moving trail, shown in FIG. 6B, with coordinates of a start point being a captured preview image and coordinates of an end point being the album key 404, and continue to display a preview image that is captured in selfie mode by using the front-facing camera, to be specific, display a GUI shown in FIG. 6C.

However, in this embodiment of the present disclosure, if the terminal receives the enabling command of the user on the photographing shutter (a command corresponding to a touch of the finger of the user on the photographing key 403, as shown in FIG. 5A), the terminal may display, on the display screen, a first user interface 503 shown in FIG. 5B, where the first user interface 503 shown in FIG. 5B includes a first image 501 and a second image 502 that are mirrors of each other, instead of continuing displaying, on the display screen of the terminal, the preview image that is captured in selfie mode by using the front-facing camera, to be specific, displaying GUIs shown in FIG. 6B and FIG. 6C. To be specific, as shown in FIG. 7, S304 in FIG. 3 may be replaced with S304'.

S304': The terminal receives the enabling command of the user on the photographing shutter, stops displaying, on the display screen, the preview image that is captured in selfie mode by using the front-facing camera, and displays a first user interface.

In this embodiment of the present disclosure, the first image may be a selfie mirror image, and the second image that is a mirror of the first image may be a selfie non-mirror image; or the first image may be a selfie non-mirror image, and the second image that is a mirror of the first image may be a selfie mirror image.

For example, it is assumed that the first image is the selfie mirror image of the user X, and the second image that is a mirror of the first image is the selfie non-mirror image of the user X. As shown in FIG. 5B, the first user interface 503 includes the first image 501 and the second image 502 that is a mirror of the first image 501.

In this embodiment of the present disclosure, the preview image captured by using the camera may be the selfie mirror image of the user X, or the preview image captured by using the camera may be the selfie non-mirror image of the user X. When the preview image captured by using the camera is the selfie mirror image of the user X, the terminal may perform mirroring on the selfie mirror image, to obtain the selfie non-mirror image of the user X. When the preview image captured by using the camera is the selfie non-mirror image of the user X, the terminal may perform mirroring on the selfie mirror image, to obtain the selfie mirror image of the user X.

In this embodiment of the present disclosure, a selfie mirror image of a target object (such as the user X) is a mirror of the target object, to be specific, a target object that is viewed in a mirror. A real target object and a selfie mirror image may be reversed horizontally, to obtain corresponding images. A selfie non-mirror image is the same as an image of the real target object.

Figure 8:
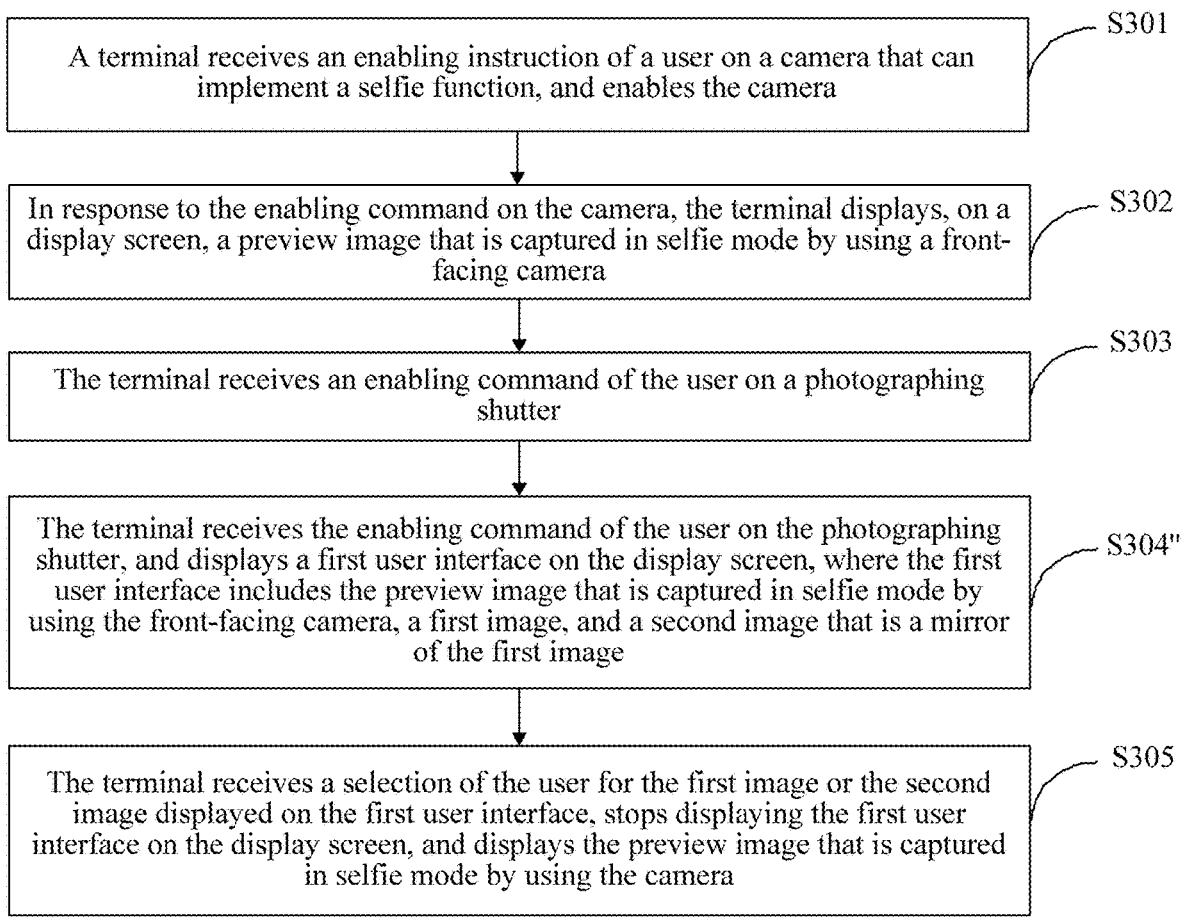
FIG. 8 is a third flowchart of a photographing method according to an embodiment of the present disclosure.

Further, the first user interface may include the preview image that is captured in selfie mode by using the front-facing camera. As shown in FIG. 8, S304 shown in FIG. 3 or S304' shown in FIG. 7 may be replaced with S304".

S304": The terminal receives the enabling command of the user on the photographing shutter, and displays a first user interface on the display screen, where the first user interface includes the preview image that is captured in selfie mode by using the front-facing camera, a first image, and a second image that is a mirror of the first image.

For example, as shown in FIG. 9A, when the finger of the user X touches or approaches the displayed photographing key 403 of the camera on the display panel, the touch panel 231 of the terminal 200 detects the touch event on or close to the touch panel 231, and transfers the touch event to the processor 280, to determine an instruction (namely, the enabling command of the user on the photographing shutter) corresponding to the touch event. Subsequently, the processor 280 obtains, according to the instruction, a preview image that is captured by using the camera when the user X touches the photographing key 403 (or after the user X touches the photographing key 403 for a preset time). In this case, the terminal can display, on the display screen, a first user interface 901 shown in FIG. 9B. As shown in FIG. 9B, the first user interface 901 includes the viewfinder frame 401, and the first image 501 and the second image 502 that are mirrors of each other. The viewfinder frame 401 shown in FIG. 9B is used to display a preview image 902 that is captured by using the camera.

Optionally, the first user interface may be a user interface including a plurality of layers. On the first user interface, "the preview image captured by using the camera" may be displayed as a background layer, and the first image and the second image that are mirrors of each other may be displayed on a previous layer of "the preview image captured by using the camera". The first image and the second image that are mirrors of each other may block a part of "the preview image captured by using the camera".

For example, as shown in FIG. 10A, when the terminal 200 receives the enabling command of the user on the photographing shutter, the terminal can display, on the display screen, the first user interface 901 shown in FIG. 10B. As shown in FIG. 10B, the first user interface 901 may include the viewfinder frame 401. "A preview image 1201 captured by using the camera" may be displayed on a background layer of the viewfinder frame 401, and the first image 501 and the second image 502 that are mirrors of each other may be displayed on a previous layer of the background layer.

It should be noted that, FIG. 9 and FIG. 10 provide, merely by using examples, schematic diagrams of examples of displaying the first user interface including the preview image that is captured in selfie mode by using the camera, and the first image and the second image that are mirrors of each other. A layout manner, of the preview image captured by using the camera, and the first image and the second image that are mirrors of each other, on the first user interface includes, but is not limited to, a layout manner on a GUI shown in FIG. 9 or FIG. 10. Another layout manner is not described in detail herein in this embodiment of the present disclosure.

It should be noted that, because an object to be photographed such as a pose of the user during selfie-taking, a photographing angle, or the like may change, in FIG. 5A, FIG. 6A, FIG. 6C, FIG. 9B, and FIG. 10B, preview images displayed in the viewfinder frames 401 may all be different, and in FIG. 5A, FIG. 6A, FIG. 6C, FIG. 9B, and FIG. 10B, the preview images displayed in the viewfinder frames 401 may all dynamically vary with the object to be photographed, the photographing angle, or the like. For example, the preview image displayed in the viewfinder frame 401 in FIG. 9B is different from the preview image displayed in the viewfinder frame 401 in FIG. 10B.

Figure 11:
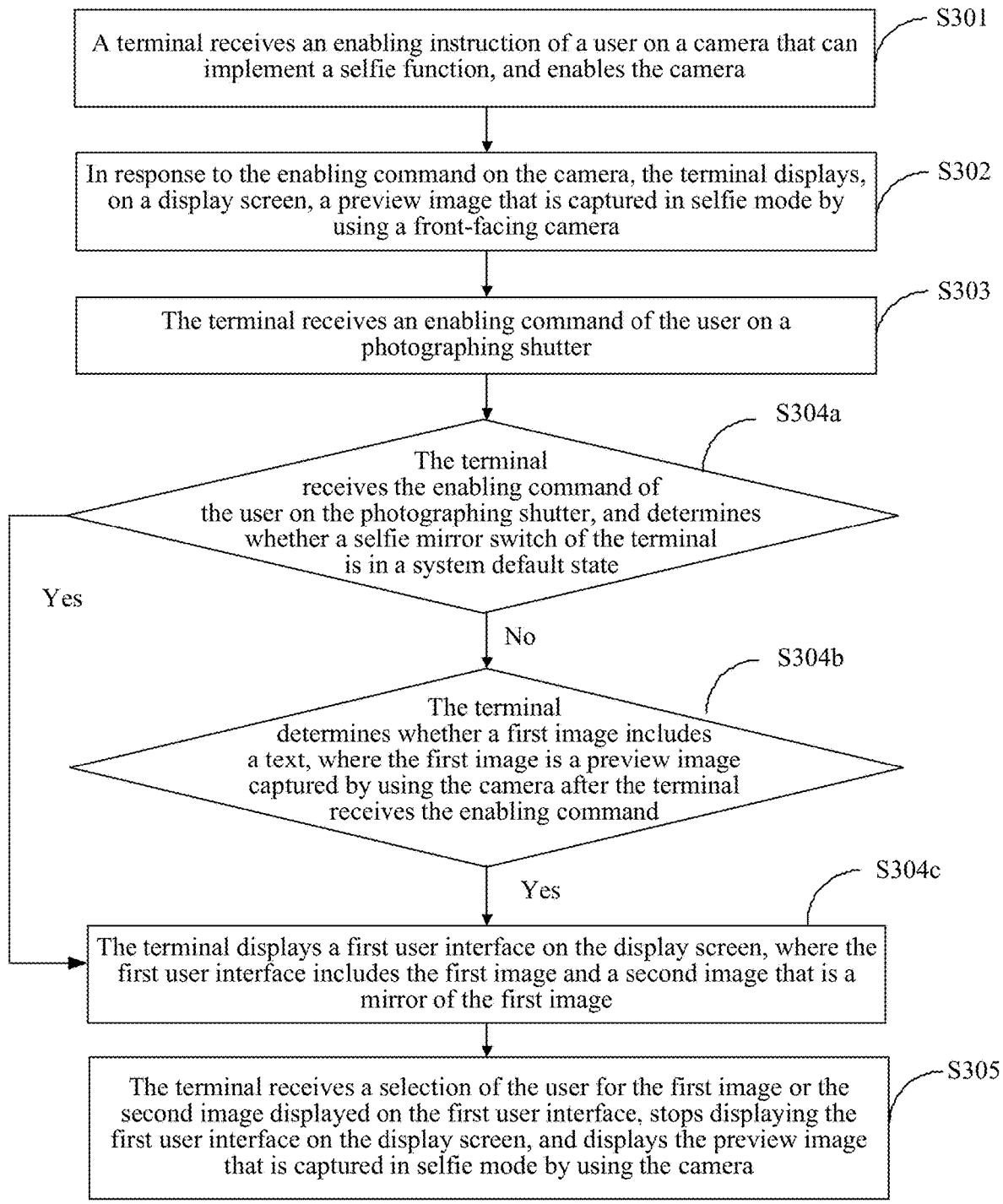
FIG. 11 is a fourth flowchart of a photographing method according to an embodiment of the present disclosure.

Further, when receiving the enabling command of the user on the photographing shutter, the terminal may first determine whether a selfie mirror switch of the terminal is in a system default state, to be specific, may first determine whether the selfie mirror switch of the terminal has been set by the user. If the selfie mirror switch of the terminal is in the system default state, it indicates that the selfie mirror switch has not been set by the user. In this case, the user may not know that the terminal has a selfie mirror setting function. In this case, the terminal may enter the first user interface, so that the user may select an image from the first image and the second image that are mirrors of each other and that are displayed on the first user interface. Specifically, as shown in FIG. 11, S304 shown in FIG. 3 may be replaced with S304a and S304c, or may be replaced with S304a to S304c.

S304a: The terminal receives the enabling command of the user on the photographing shutter, and determines whether a selfie mirror switch of the terminal is in a system default state.

The system default state may be a state corresponding to a factory default of the selfie mirror switch of the terminal, for example, a disabled state of the selfie mirror switch. That the selfie mirror switch is in the system default state is that the selfie mirror switch has never been set, to be specific, the user never sets the selfie mirror switch in the terminal.

If the selfie mirror switch of the terminal is in the system default state, S304c may be performed. If the selfie mirror switch of the terminal is in a non-system default state, S304b may be performed.

S304b: The terminal determines whether a first image includes a text, where the first image is a preview image captured by using the camera after the terminal receives the enabling command.

If the first image includes a text, and the first image is a selfie mirror image, the text in the first image is a mirror of a real text, and it does not conform to a habit of viewing a text by common users. Therefore, if the first image includes a text, the terminal displays the first user interface including two images that are mirrors of each other, for selection by the user. To be specific, S304c may be performed. For example, assuming that the first image is the image 501 shown in FIG. 5B, the terminal may detect that the image 501 includes a text such as "2005", and may perform S304c.

It should be noted that, in this embodiment of the present disclosure, the text may be a Chinese character, Pinyin, an English letter, a number, and texts in other languages.

Figure 12:
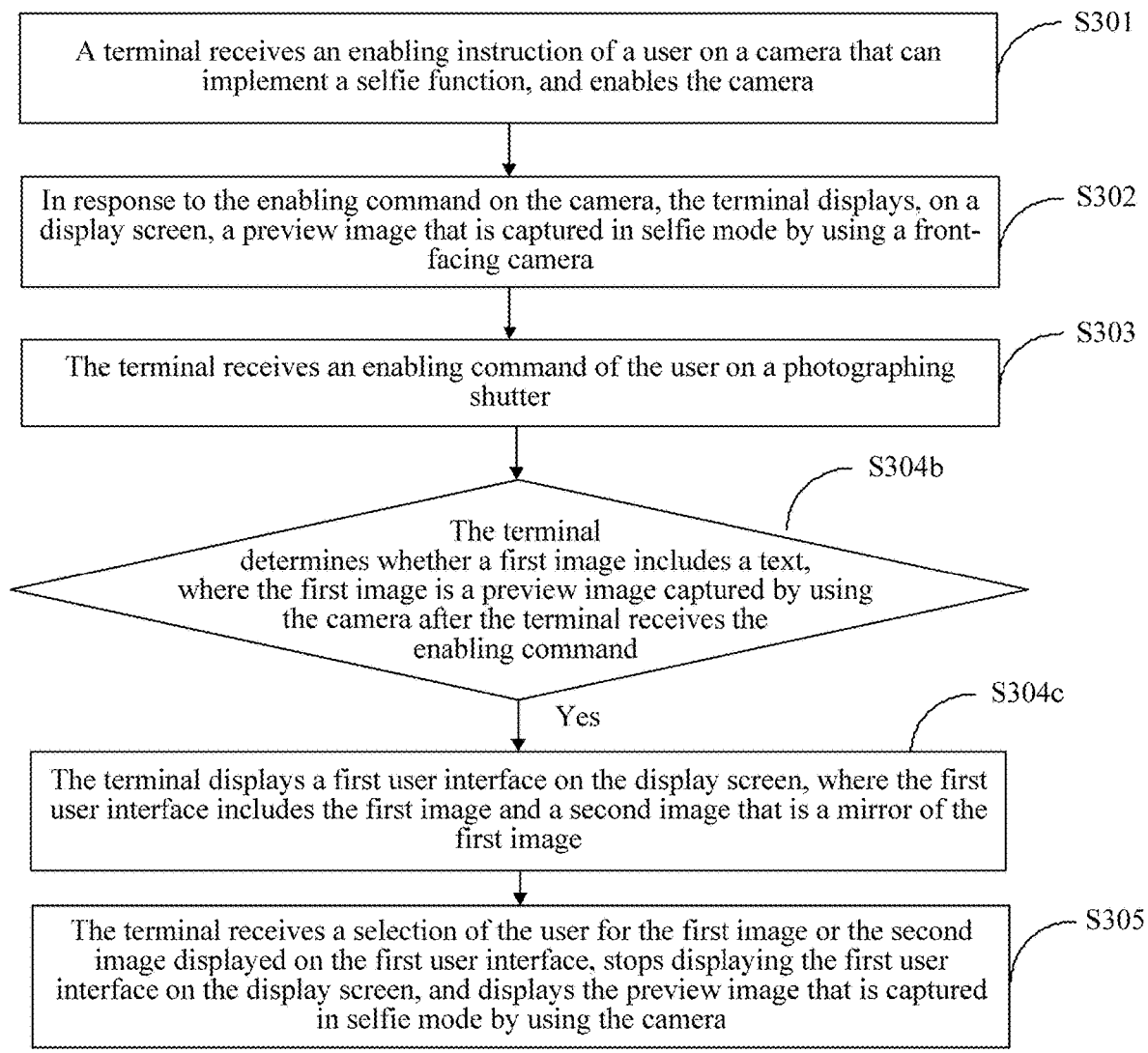
FIG. 12 is a fifth flowchart of a photographing method according to an embodiment of the present disclosure.

S304a is optional. As shown in FIG. 12, S304 in FIG. 3 may be replaced with S304b and S304c. To be specific, when receiving the enabling command of the user on the photographing shutter, the terminal may determine whether the first image includes a text, and if the first image includes a text, continue to perform S304c.

S304c: The terminal displays a first user interface on the display screen, where the first user interface includes the first image and a second image that is a mirror of the first image.

It should be noted that, for a specific manner of "displaying, by the terminal, the first user interface on the display screen" in S304c, refer to related descriptions of "displaying, by the terminal, the first user interface on the display screen" in S304' or S304", and details are not described herein again in this embodiment of the present disclosure.

When the first image is a set of at least two images, when the user touches or taps the first image, the terminal may successively display all the images in the set in an order of capturing the images included in the set, to display the dynamic first image. Because the second image and the first image are mirrors of each other, when the first image is a set of at least two images, the second image includes a set of images that are mirrors of the at least two images. A display method and a display effect of the second image are similar to those of the first image, and details are not described herein again in this embodiment of the present disclosure.

S305: The terminal receives a selection of the user for the first image or the second image displayed on the first user interface, stops displaying the first user interface on the display screen, and displays the preview image that is captured in selfie mode by using the camera.

Figures 22A, 22B:
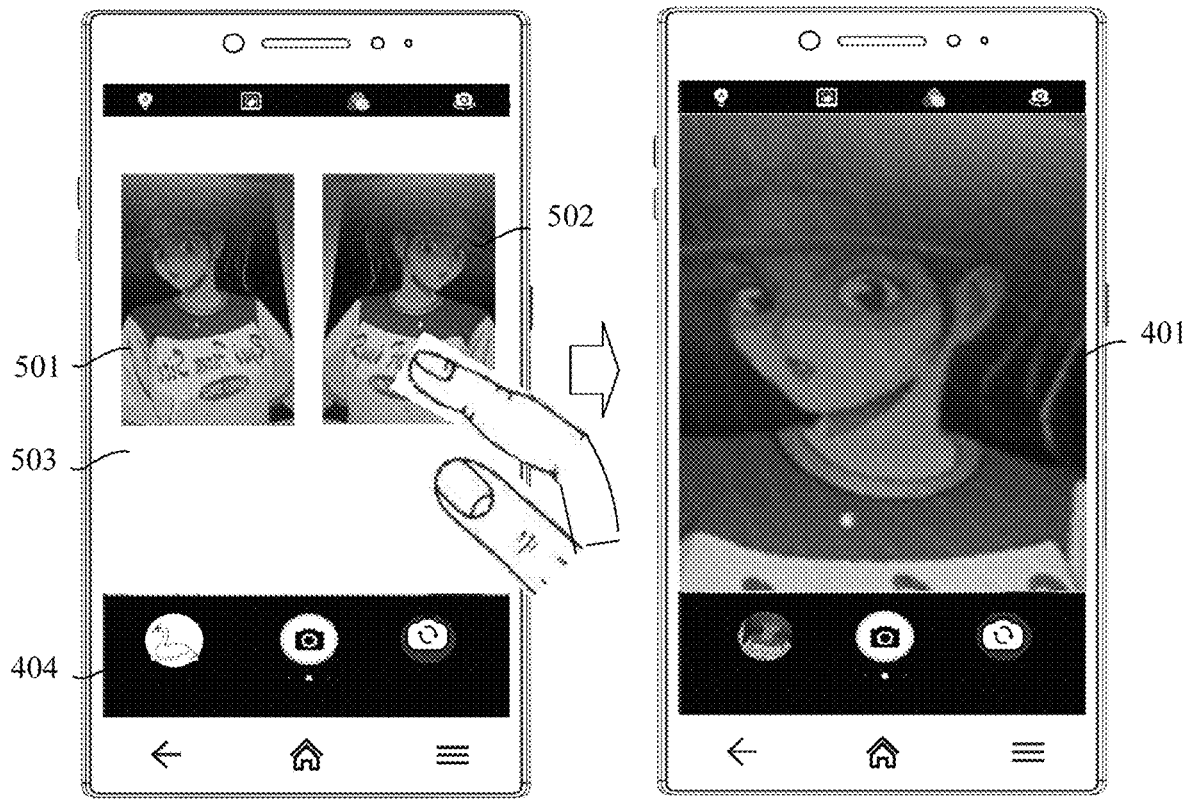
FIGS. 22A and 22B are examples of graphical user interfaces of an electronic device according to some embodiments.

For example, an example in which the first user interface is the first user interface shown in FIG. 5B is used. As shown in FIG. 22A, when the finger of the user X touches or approaches the second image 502 displayed on the display panel 241 shown in FIG. 22A, the touch panel 231 of the terminal 200 detects the touch event on or close to the touch panel 231, and transfers the touch event to the processor 280, to determine an instruction corresponding to the touch event. Subsequently, the processor 280 may display, according to the instruction, a GUI shown in FIG. 22B. The GUI shown in FIG. 22B includes the preview image that is captured in selfie mode by using the camera.

Optionally, while displaying, in response to the selection of the user for the first image or the second image on the first user interface, an image selected from the first image and the second image, the terminal may store the selected image in the album of the terminal.

For example, as shown in FIG. 22B, while the terminal displays, in response to the selection of the user for the first image or the second image displayed on the first user interface, the preview image that is captured in selfie mode by using the camera, a photograph displayed on an icon corresponding to the album key 404 changes from a "swan" shown in FIG. 22A to a photograph obtained by scaling down the second image 502.

Optionally, in response to the selection of the user, the terminal may further display the image selected from the first image and the second image.

Figures 13, 13A, 13B:
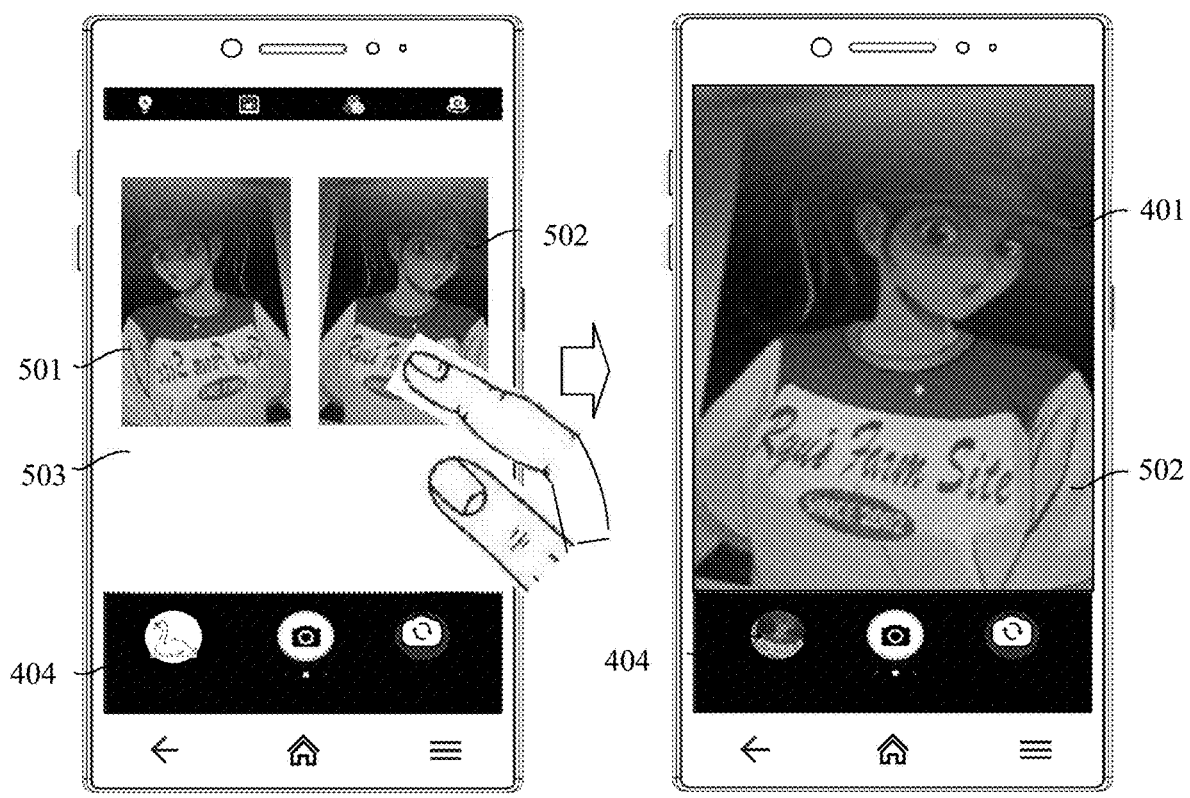
FIG. 13 is a sixth schematic diagram of an example of a selfie screen of a terminal according to an embodiment of the present disclosure.

For example, an example in which the first user interface is the first user interface shown in FIG. 5B is used. As shown in FIG. 13A, when the finger of the user X touches or approaches the second image 502 displayed on the display panel 241 shown in FIG. 13A, the touch panel 231 of the terminal 200 detects the touch event on or close to the touch panel 231, and transfers the touch event to the processor 280, to determine an instruction corresponding to the touch event. Subsequently, the processor 280 may display, according to the instruction, a GUI shown in FIG. 13B. The GUI shown in FIG. 13B includes the selected image 502.

According to the photographing method provided in this embodiment of the present disclosure, after receiving the enabling command of the user on the photographing shutter, the terminal may display the first user interface including the first image obtained based on the preview image and the second image that is a mirror of the first image, for selection by the user; then receive a selection input of the user (may further display the selected image in response to the selection of the user for the first image or the second image displayed on the first user interface, instead of displaying an image that is not selected); and next, may further perform a storage operation on the image selected by the user, or if the first image and the second image are already stored in the terminal, delete the image that is not selected by the user. The selection of the user for the first image or the second image that is a mirror of the first image can actually reflect a preference of the user for a selfie mirror image or a selfie non-mirror image of the user and meet a requirement of the user. In addition, during subsequent selfie-taking, only a selfie image meeting a requirement of the user is stored, and user experience can be improved when a selfie function is implemented.

Optionally, while displaying, in response to the selection of the user for the first image or the second image on the first user interface, an image selected from the first image and the second image, the terminal may store the selected image in the album of the terminal. For example, as shown in FIG. 13B, while the terminal displays, in response to the selection of the user for the first image or the second image displayed on the first user interface, the image selected from the first image and the second image, a photograph displayed on an icon corresponding to the album key 404 changes from a "swan" shown in FIG. 13A to a photograph obtained by scaling down the second image 502.

Figure 14:
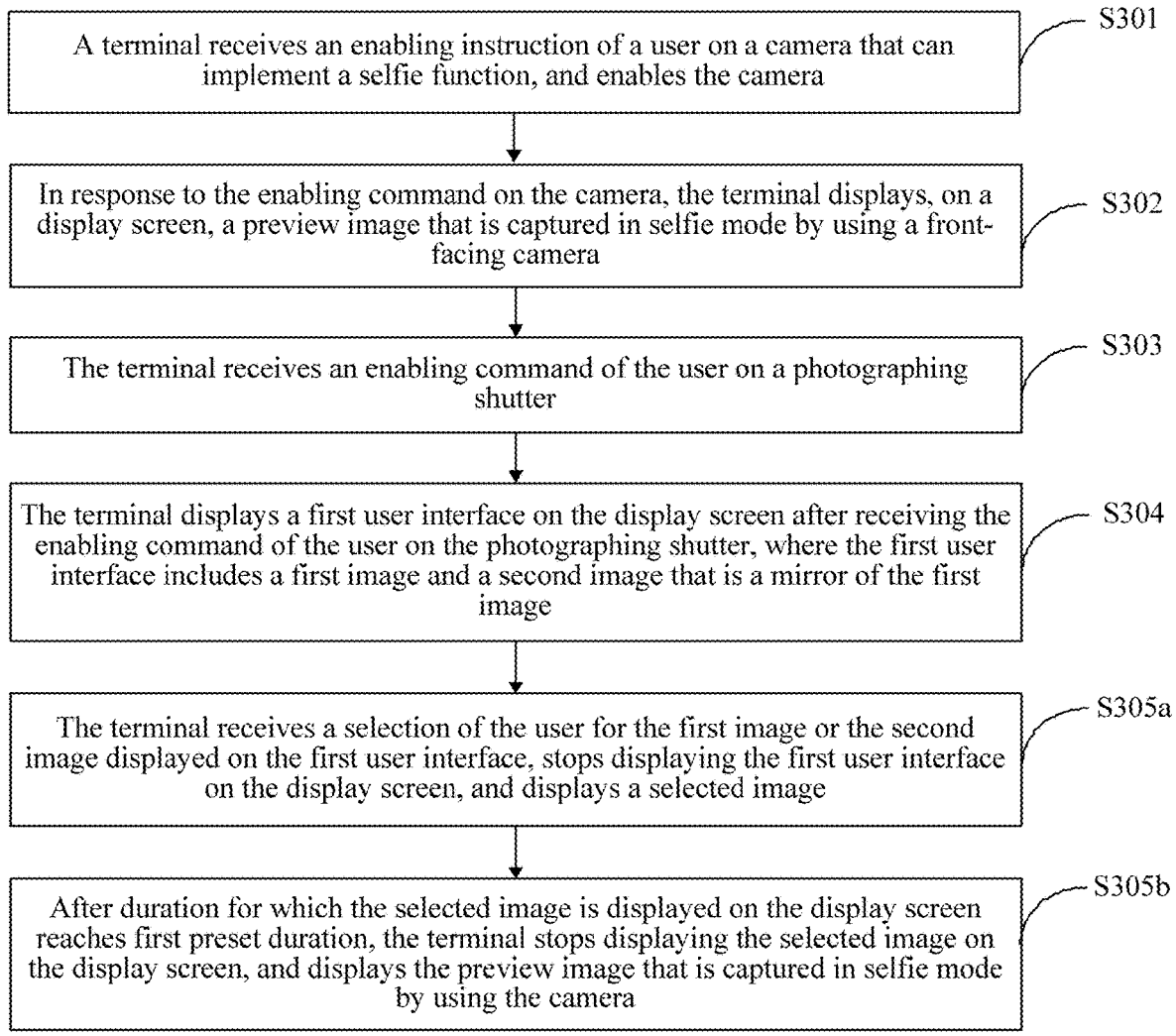
FIG. 14 is a sixth flowchart of a photographing method according to an embodiment of the present disclosure.

Optionally, after displaying, for specific duration (such as 10 seconds) in response to the selection of the user for the first image or the second image displayed on the first user interface, the image selected from the first image and the second image, the terminal may further continue to display the preview image that is captured in selfie mode by using the front-facing camera. Specifically, S305 may be replaced with S305a and S305b. For example, as shown in FIG. 14, S305 shown in FIG. 12 may be replaced with S305a and S305b.

S305a: The terminal receives a selection of the user for the first image or the second image displayed on the first user interface, stops displaying the first user interface on the display screen, and displays a selected image.

S305b: After duration for which the selected image is displayed on the display screen reaches first preset duration, the terminal stops displaying the selected image on the display screen, and displays the preview image that is captured in selfie mode by using the camera.

A first moment is a moment at which only the image selected from the first image and the second image is displayed, instead of displaying both the first image and the second image, in response to the selection of the user for the first image or the second image displayed on the first user interface.

For example, FIG. 15A is the same as FIG. 13A, FIG. 15B is the same as FIG. 13B, and details are not described herein again in this embodiment of the present disclosure. After the first preset duration t starting from a time point at which the terminal performs S305 to display a GUI shown in FIG. 15B, the terminal may display a GUI shown in FIG. 15C, to be specific, the terminal may continue to display the preview image that is captured in selfie mode by using the front-facing camera.

After receiving the selection input of the user, the terminal may also directly display the preview image that is captured in selfie mode by using the front-facing camera, instead of displaying the first image and the second image (the terminal exits the first user interface). Alternatively, after receiving the selection input of the user, the terminal may display, after preset duration is reached, the preview image that is captured in selfie mode by using the front-facing camera, instead of displaying the first image and the second image (the terminal exits the first user interface).

Optionally, while the terminal displays the image selected from the first image and the second image, to help the user continue to take a selfie by using the front-facing camera, as shown in FIG. 16A, the terminal may display a "camera" back button 1601. To be specific, FIG. 13B may be replaced with FIG. 16A.

As shown in FIG. 16B, when the finger of the user X touches or approaches the "camera" back button 1601 displayed on the display panel 241 shown in FIG. 16B, the touch panel 231 of the terminal 200 detects the touch event on or close to the touch panel 231, and transfers the touch event to the processor 280, to determine an instruction corresponding to the touch event. Subsequently, the processor 280 may display, according to the instruction, a GUI shown in FIG. 16C. To be specific, the terminal may continue to display the preview image that is captured in selfie mode by using the front-facing camera. The user may also implement a function of returning to the camera by performing another operation, for example, a voice operation, a gesture operation, or a touch or press operation on another virtual or physical key.

Figure 17:
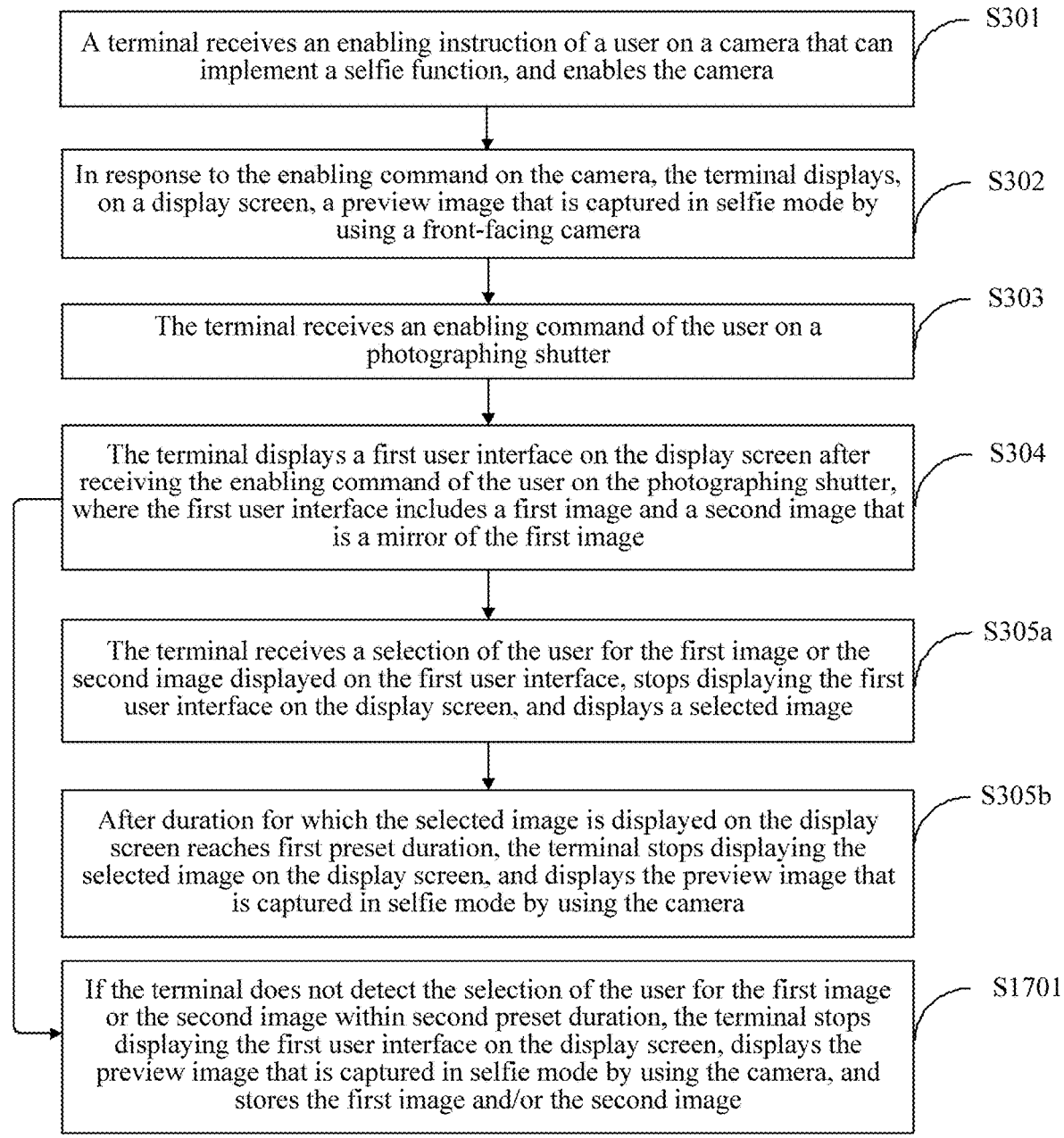
FIG. 17 is a seventh flowchart of a photographing method according to an embodiment of the present disclosure.

Further, in an application scenario of this embodiment of the present disclosure, the user may not select, in time due to some unexpected situations, the first image or the second image displayed by the terminal on the first user interface. Based on such a scenario, after S304, S304', S304", or S304c, the method in this embodiment of the present disclosure may further include S1701, and S305 may be replaced with S305'. For example, as shown in FIG. 17, after S304 shown in FIG. 14, the method in this embodiment of the present disclosure may further include S1701.

S1701: If the terminal does not detect the selection of the user for the first image or the second image within second preset duration, the terminal stops displaying the first user interface on the display screen, displays the preview image that is captured in selfie mode by using the camera, and stores the first image and/or the second image.

If the terminal does not detect the selection of the user for the first image or the second image within the second preset duration, the terminal may further store either of the first image and the second image or store both the first image and the second image.

Further, after receiving the enabling command of the user on the photographing shutter, the terminal may generate and store the first image and the second image, and then display the first user interface on the display screen. In this case, after receiving the selection of the user for the first image or the second image on the first user interface, the terminal may delete the image that is not selected by the user from the first image and the second image. Alternatively, if the terminal does not detect the selection of the user for the first image or the second image within the second preset duration, the terminal may delete either of the first image and the second image when the first image and the second image are already stored.

Further, the terminal may automatically set the selfie mirror switch of the terminal based on the selection of the user for the first image or the second image. After S305 or S305a, the method in this embodiment of the present disclosure may further include S1801 and S1802.

S1801: In response to the selection of the user for the first image or the second image displayed on the first user interface, the terminal determines whether the selected image is a selfie mirror image.

S1802: If the selected image is a selfie mirror image, the terminal sets the selfie mirror switch to an enabled state.

S1803: If the selected image is a selfie non-mirror image, the terminal sets the selfie mirror switch to a disabled state.

The first image is the selfie mirror image, and the second image is the selfie non-mirror image; or the first image is the selfie non-mirror image, and the second image is the selfie mirror image.

According to the photographing method provided in this embodiment of the present disclosure, in response to the selection of the user for the first image or the second image, the terminal may automatically set the selfie mirror switch of the terminal, so that user operations when the user manually sets the selfie mirror switch can be reduced, thereby saving time and energy of searching for a setting menu by the user, improving operation efficiency, and improving intelligence of human-computer interaction.

Optionally, while displaying, on the first user interface, the first image and the second image that are mirrors of each other, the terminal may display mirror prompt information on the first user panel. The mirror prompt information may include at least one of first prompt information, second prompt information, and third prompt information.

The first prompt information may be used to prompt the user to select an image that the user intends to store from the first image and the second image. The third prompt information is used to indicate a setting manner of the selfie mirror switch of the terminal.

The second prompt information may be used to indicate a selfie mirror image and a selfie non-mirror image in the first image and the second image. For example, the second prompt information may be used to indicate that, in the first image and the second image, the first image is the selfie mirror image, and the second image is the selfie non-mirror image; or the second prompt information may be used to indicate that, in the first image and the second image, the first image is the selfie non-mirror image, and the second image is the selfie non-mirror image.

Figure 18:
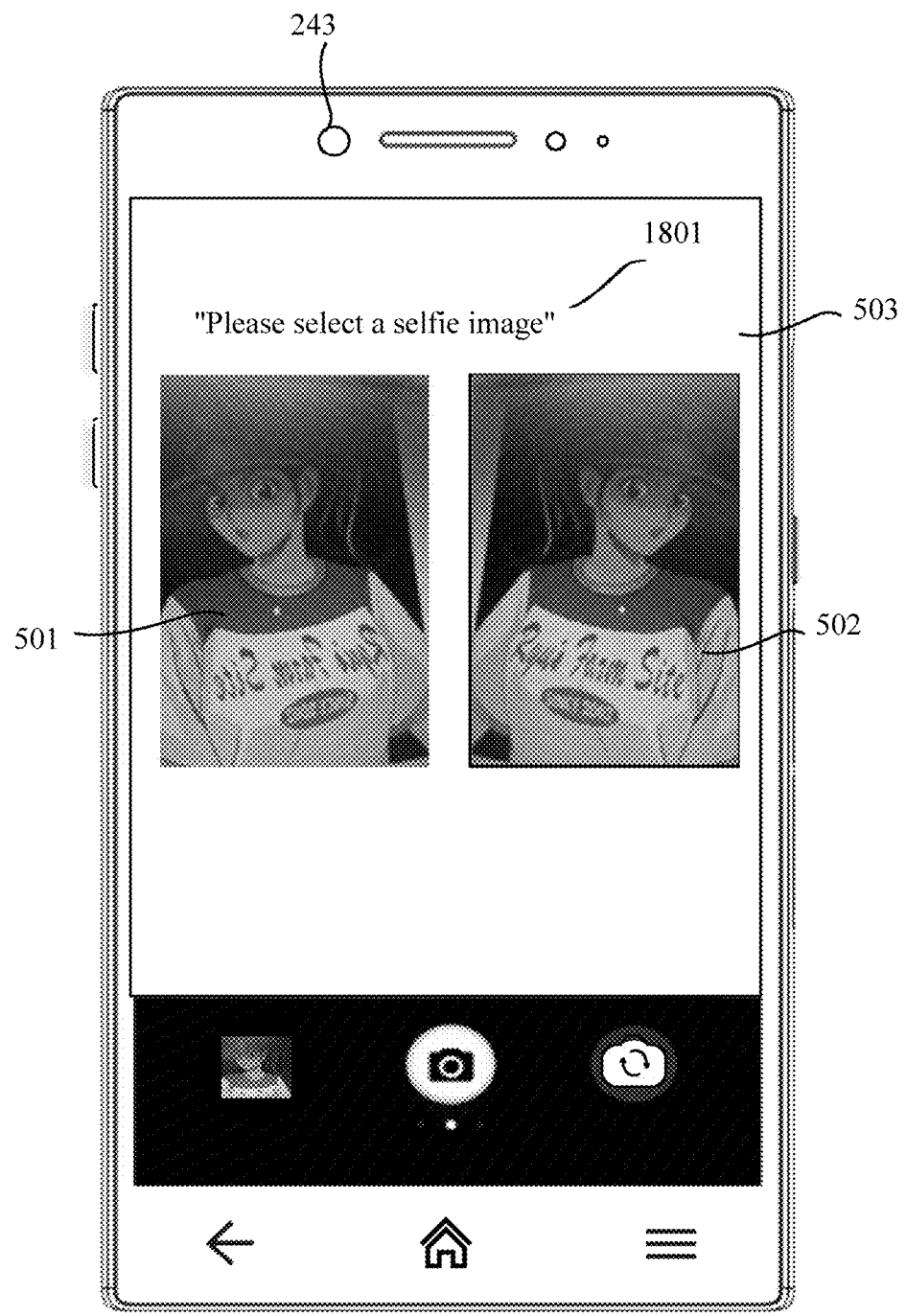
FIG. 18 is a ninth schematic diagram of an example of a selfie screen of a terminal according to an embodiment of the present disclosure.

For example, as shown in FIG. 18, the first user interface 503 shown in FIG. 5B is used as an example. Mirror prompt information 1801 may further be displayed on the first user interface 503. The mirror prompt information 1801 may include first prompt information, and the first prompt information may be "Please select a selfie image (that you intend to store)".

Figure 19:
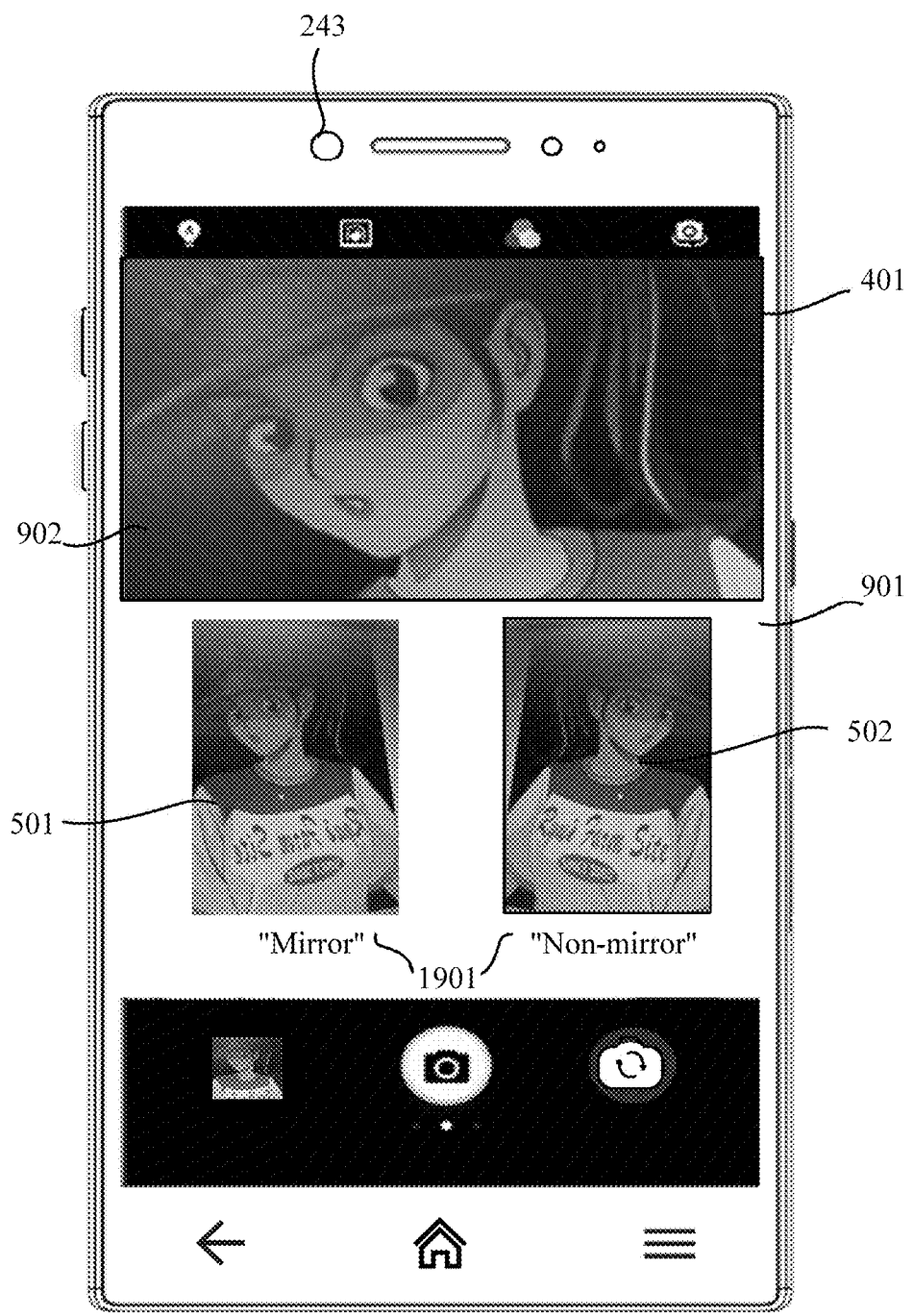
FIG. 19 is a tenth schematic diagram of an example of a selfie screen of a terminal according to an embodiment of the present disclosure.

As shown in FIG. 19, the first user interface 901 shown in FIG. 9B is used as an example. Mirror prompt information 1901 may further be displayed on the first user interface 901. The mirror prompt information 1901 may include second prompt information, and the second prompt information may be prompt information "Mirror" displayed at a corresponding position of the first image and prompt information "Non-mirror" displayed at a corresponding position of the second image.

It may be understood that, the second prompt information displayed by the terminal helps the user clarify which one of the first image and the second image displayed by the terminal is the selfie mirror image, and which one of the first image and the second image displayed by the terminal is the selfie non-mirror image, so that the user can be prevented from incorrectly selecting the selfie mirror image or the selfie non-mirror image.

Further, the third prompt information may include a "selfie mirror switch" button of the terminal. With reference to FIG. 19, as shown in FIG. 20, a "selfie mirror switch" button 2001 may further be displayed on the first user interface 901.

Figure 21:
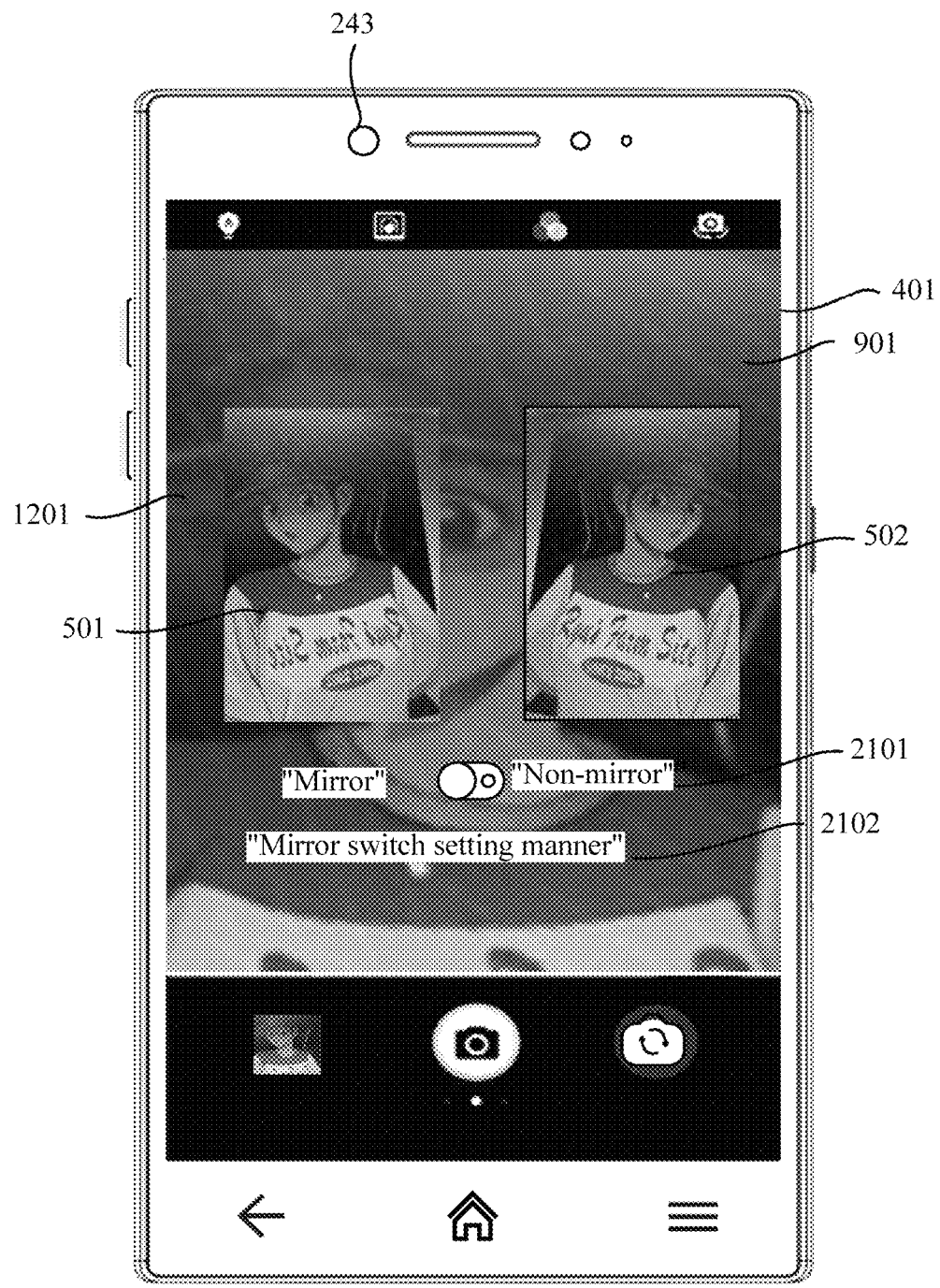
FIG. 21 is a twelfth schematic diagram of an example of a selfie screen of a terminal according to an embodiment of the present disclosure.

As shown in FIG. 21, the first user interface 901 shown in FIG. 10B is used as an example. Second prompt information 2101 and third prompt information 2102 may further be displayed on the first user interface 901. The second prompt information 2101 may be prompt information "Mirror" displayed at a corresponding position of the first image and prompt information "Non-mirror" displayed at a corresponding position of the second image. The third prompt information 2102 may be "Mirror switch setting manner".

Figure 20:
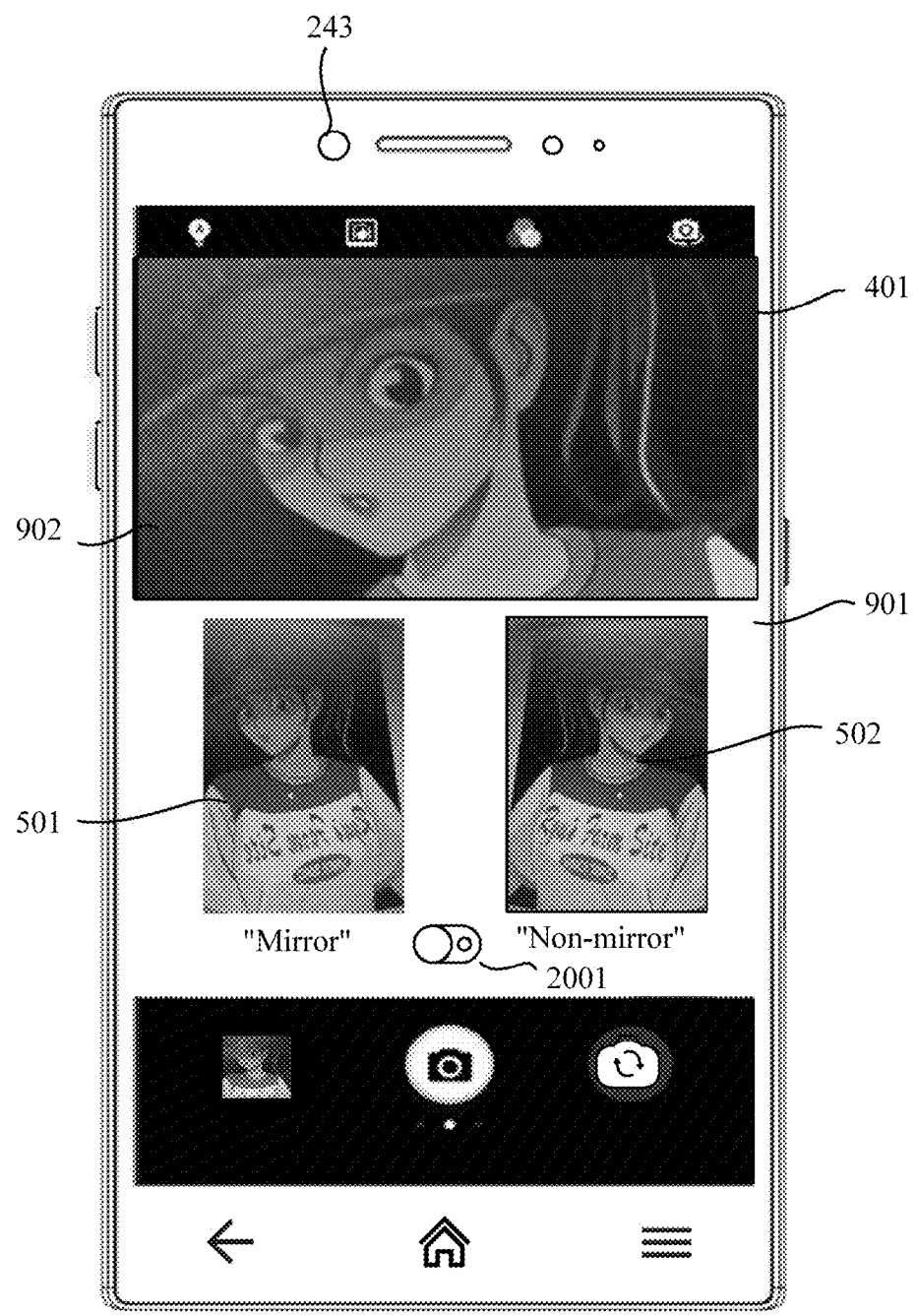
FIG. 20 is an eleventh schematic diagram of an example of a selfie screen of a terminal according to an embodiment of the present disclosure.

It should be noted that, in this embodiment of the present disclosure, specific content and forms of the first prompt information, the second prompt information, and the third prompt information, and display positions of the prompt information on the display panel of the terminal 200 include, but are not limited to, content and positions in the GUI shown in FIG. 19, FIG. 20, or FIG. 21; and other content, forms, and display positions of the prompt information are not described herein in this embodiment of the present disclosure.

Further, a requirement of the user may change. For example, the user stores a selfie mirror image (such as the first image) when taking a selfie, but when viewing the selfie mirror image subsequently, the user intends to store a selfie non-mirror image (such as the second image that is a mirror of the first image). To adapt to the change in the requirement of the user, in the photographing method provided in this embodiment of the present disclosure, the terminal may further perform mirroring on an image that is already stored. For example, after the terminal stores the selected image, the method in this embodiment of the present disclosure may further include S2201.

S2201: When the terminal displays an image on the display screen, for example, opens a "gallery", in response to a mirror transformation command entered by the user, the terminal transforms the image into an image that is a mirror of the selected image.

S2202: The terminal displays, on the display screen, the image that is a mirror of the selected image.

After any image is displayed on the display screen, the terminal may perform mirroring on the image in response to the mirror transformation command of the user, to obtain and display an image that is a mirror of the selected image.

According to the photographing method provided in this embodiment of the present disclosure, user experience when the selfie image is displayed can be improved, and further, in response to the selection of the user for the first image or the second image, the selfie mirror switch of the terminal can be automatically set, so that user operations when the user manually sets the selfie mirror switch can be reduced.

In addition, when the terminal displays a selfie image stored by the terminal, even if a user preference or requirement changes, for example, the user stores a selfie mirror image when taking a selfie, but when viewing the stored selfie image subsequently, the user intends to store a selfie non-mirror image, the terminal may perform mirroring on the selfie image that is already stored (for example, transform the selfie mirror image that is already stored into a selfie non-mirror image), to meet the requirement of the user.

The solutions provided in the embodiments of this application are mainly described above from a perspective of a photographing process of the terminal. It may be understood that, to implement the foregoing functions, the terminal includes corresponding function modules for performing the functions. A person skilled in the art should be easily aware that, in combination with the terminal and algorithm operations of the examples described in the embodiments disclosed in this specification, this application can be implemented by hardware or in a form of a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

The terminal provided in the embodiments of this application is configured to implement the foregoing method embodiments. Specifically, the terminal may be divided based on the foregoing method examples. For example, the modules or units may be divided corresponding to the functions. Alternatively, two or more functions may be integrated into a processing module. The integrated module may be implemented in a form of hardware, or may be implemented in a form of a software module or unit. The module or unit division in the embodiments of this application is an example and is merely logical function division, and may be other division during actual implementation.

Figure 22:
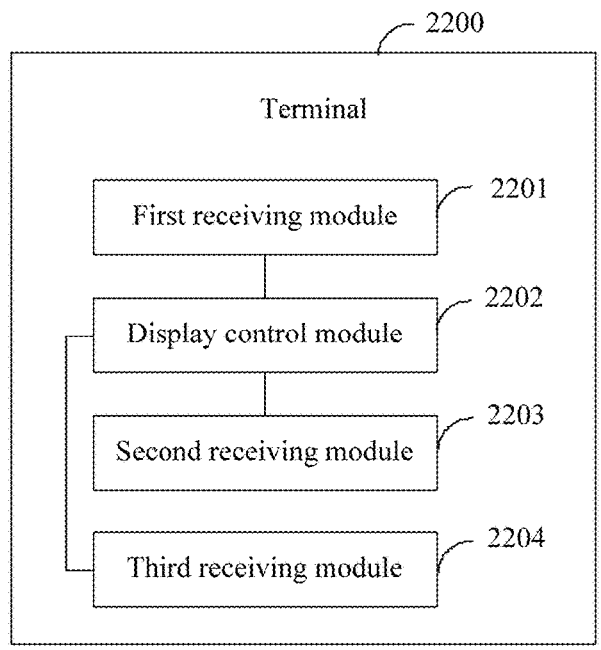
FIG. 22 is a first schematic structural diagram of a terminal according to an embodiment of the present invention.

FIG. 22 is a possible schematic structural diagram of the terminal used in the foregoing embodiment. The terminal may be a terminal including a camera and a display screen. The camera may be a front-facing camera or a rear-facing camera that can be rotated and used as a front-facing camera. As shown in FIG. 22, the terminal 2200 may include a first receiving module 2201, a display control module 2202, a second receiving module 2203, and a third receiving module 2204.

The first receiving module 2201 is configured to support S301 in the method embodiments, and/or another process used for the technologies described in this specification. The display control module 2202 is configured to support the operation of "stopping displaying a first user interface on the display screen, and displaying a preview image that is captured in selfie mode by using the camera" in S302, S304, S304', S304", S304c, and S305, the operation of "stopping displaying the first user interface on the display screen, and displaying a selected image" in S305a, the operation of "stopping displaying the first user interface on the display screen, and displaying the preview image that is captured in selfie mode by using the camera" in S305b and S1701, and S2202 in the method embodiments, and/or another process used for the technologies described in this specification. The second receiving module 2203 is configured to support S303 in the method embodiments, and/or another process used for the technologies described in this specification. The third receiving module 2204 is configured to support the operation of "receiving a selection of the user for the first image or the second image displayed on the first user interface" in S305 and S305a in the method embodiments, and/or another process used for the technologies described in this specification.

Further, the terminal 2200 may include a first judging module. The first judging module is configured to support S304b in the method embodiments, and/or another process used for the technologies described in this specification.

Further, the terminal 2200 may include a second judging module. The second judging module is configured to support S304a in the method embodiments, and/or another process used for the technologies described in this specification.

Further, the terminal 2200 may include a third judging module. The third judging module is configured to support S1801 in the method embodiments, and/or another process used for the technologies described in this specification.

Figure 23:
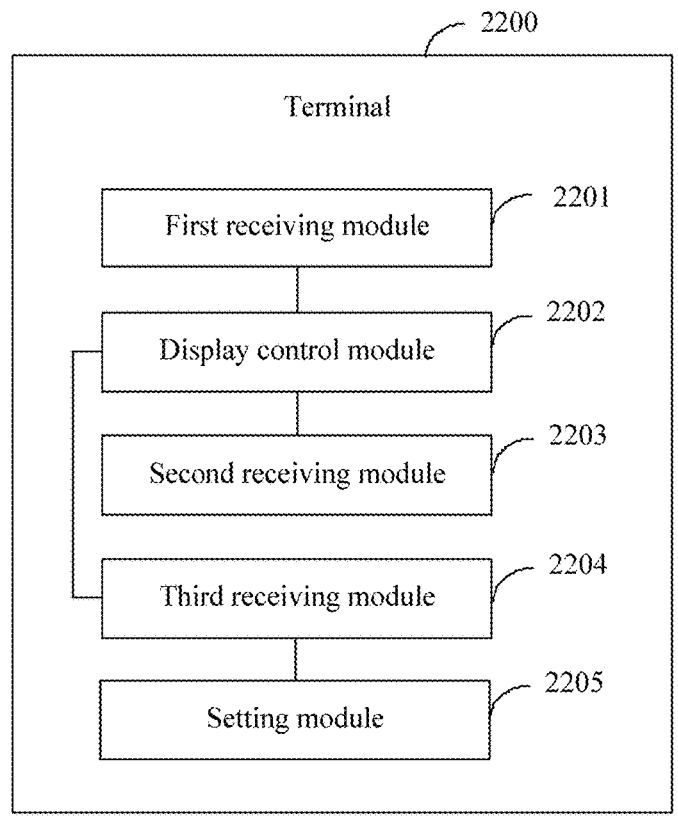
FIG. 23 is a second schematic structural diagram of a terminal according to an embodiment of the present disclosure.

Further, as shown in FIG. 23, the terminal 2200 may include a setting module 2205. The setting module 2205 is configured to support S1802 and S1803 in the method embodiments, and/or another process used for the technologies described in this specification.

Further, the terminal 2200 may include a storage module. The storage module is configured to store the first image and/or the second image, and/or another process used for the technologies described in this specification.

Further, the terminal 2200 may include a deletion module. The deletion module is configured to: after the third receiving module receives the selection of the user for the first image or the second image on the first user interface, delete an image that is not selected from the first image and the second image.

Further, the terminal 2200 may include a mirror transformation module. The mirror transformation module is configured to support S2201 in the method embodiments, and/or another process used for the technologies described in this specification.

The terminal 2200 includes, but is not limited to, the units and modules described by way of example above. For example, the terminal 2200 may further include a sending module configured to send data or a signal to another device, and a receiving module configured to receive data or a signal sent by another device. In addition, specific functions that can be implemented by the foregoing modules include, but are not limited to, the functions corresponding to the method operations in the foregoing examples. For detailed descriptions of another unit of the terminal 2200 and the units of the terminal 2200, refer to detailed descriptions of method operations corresponding to the units, and details are not described herein again in this embodiment of this application.

When an integrated unit is used, the detection module 2201, the judging module, the determining module, the setting module 2204, and the like may be integrated into a processing unit for implementation. The processing unit may be a processor or a controller, for example, may be a CPU, a general purpose processor, a digital signal processor (DSP), an application-specific integrated circuit (ASIC), a field programmable gate array (FPGA), or another programmable logical device, a transistor logical device, a hardware component, or any combination thereof. The processing unit may implement or execute logical blocks, modules, and circuits described with reference to the various examples described in the disclosed content of this application. The processing unit may alternatively be a combination for implementing a calculation function, for example, a combination including one or more microprocessors or a combination of a DSP and a microprocessor. The storage module may be a memory.

Figure 24:
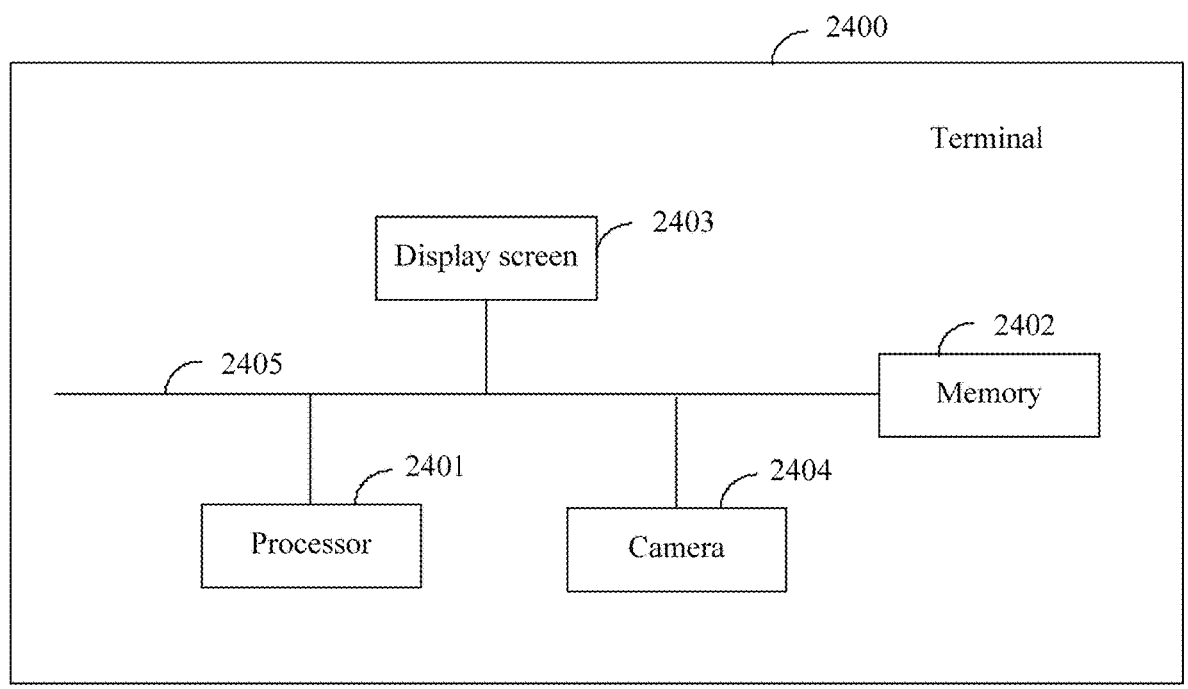
FIG. 24 is a third schematic structural diagram of a terminal according to an embodiment of the present disclosure.

When the processing unit is a processor, and the storage module is a memory, the terminal 2200 used in this embodiment of this application may be a terminal 2400 shown in FIG. 24. As shown in FIG. 24, the terminal 2400 includes one or more processors 2401, a memory 2402, a display screen 2403, and a camera 2404. The one or more processors 2401, the memory 2402, the display screen 2403, and the camera 2404 are connected to each other by using a bus 2405.

The camera 2404 may be a front-facing camera or a rear-facing camera that can be rotated for a user to take a selfie. The camera 2404 is configured to capture a selfie image of the user in selfie mode. The memory 2402 is configured to store computer program code. The computer program code includes an instruction. When the one or more processors 2401 of the terminal 2400 execute the instruction, the terminal 2400 performs related method operations in any one of FIG. 3, FIG. 7, FIG. 8, FIG. 11, FIG. 12, FIG. 14, and FIG. 17, to implement the photographing method in the foregoing embodiments.

The bus 2405 may be a peripheral component interconnect (PCI) bus, an extended industry standard architecture (EISA) bus, or the like. The bus 2405 may be classified into an address bus, a data bus, a control bus, and the like. For ease of representation, only one thick line is used to represent the bus in FIG. 24, but this does not mean that there is only one bus or only one type of bus.

An embodiment of the present disclosure further provides a computer storage medium. The computer storage medium stores computer program code. When the one or more processors 2401 of the terminal 2400 execute the computer program code, the terminal 2400 performs related method operations in any one of FIG. 3, FIG. 7, FIG. 8, FIG. 11, FIG. 12, FIG. 14, and FIG. 17, to implement the photographing method in the foregoing embodiments.

An embodiment of the present disclosure further provides a computer program product. When the computer program product is run on a computer, the computer is enabled to perform related method operations in any one of FIG. 3, FIG. 7, FIG. 8, FIG. 11, FIG. 12, FIG. 14, and FIG. 17, to implement the photographing method in the foregoing embodiments.

The terminal 2200, the terminal 2400, the computer storage medium, or the computer program product that is provided in the embodiments of the present disclosure is configured to perform the corresponding method provided above. Therefore, for beneficial effects that can be achieved by the terminal 2200, the terminal 2400, the computer storage medium, or the computer program product, refer to beneficial effects of the corresponding method provided above, and details are not described herein again.

The foregoing descriptions about implementations allow a person skilled in the art to understand that, for the purpose of convenient and brief description, division of the foregoing function modules is used as an example for description. In actual applications, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor to perform all or some of the operations of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A photographing method, applied to a terminal comprising a camera and a display screen, wherein the method comprises:
    receiving an enabling command of a user on the camera;
    in response to the enabling command on the camera, displaying, on the display screen, a preview image that is captured in selfie mode by using the camera;
    in response to receiving the enabling command of the user on a photographing shutter and in response to determining that a selfie mirror switch of the terminal has never been set by the user, displaying a first user interface on the display screen, wherein the first user interface comprises a first image and a second image that is a mirror of the first image, and the first image is obtained based on the preview image; and
    receiving a selection of the user for the first image or the second image on the first user interface, stopping displaying the first user interface on the display screen, and displaying the preview image that is captured in selfie mode by using the camera.

2. The method according to claim 1, wherein the displaying the first user interface on the display screen comprises:
    stopping displaying, on the display screen, the preview image that is captured in selfie mode by using the camera, and displaying the first user interface.

3. The method according to claim 1, wherein the first user interface further comprises the preview image that is captured in selfie mode by using a front-facing camera.

4. The method according to claim 1, wherein the receiving the selection of the user for the first image or the second image on the first user interface, stopping displaying the first user interface on the display screen, and displaying the preview image that is captured in selfie mode by using the camera specifically comprises:
    receiving the selection of the user for the first image or the second image displayed on the first user interface, stopping displaying the first user interface on the display screen, and displaying a selected image; and
    after duration for which the selected image is displayed on the display screen reaches first preset duration, stopping displaying the selected image on the display screen, and displaying the preview image that is captured in selfie mode by using the camera.

5. The method according to claim 1, wherein before the displaying the first user interface on the display screen, the method further comprises:
    using the preview image that is captured after the enabling command is received, as the first image, and determining whether the first image comprises a text; and
    the displaying the first user interface on the display screen comprises:
    displaying the first user interface on the display screen if the first image comprises the text.

6. The method according to claim 1, wherein the method further comprises:
    if the selected image is a selfie mirror, setting the selfie mirror switch of the terminal to an enabled state.

7. The method according to claim 1, wherein the method further comprises:
    if the selected image is a selfie non-mirror image, setting the selfie mirror switch of the terminal to a disabled state.

8. The method according to claim 1, wherein the first user interface further comprises mirror prompt information, and the mirror prompt information comprises at least one of first prompt information, second prompt information, and third prompt information; and the first prompt information is used to prompt the user to select an image that the user intends to store from the first image and the second image; the second prompt information is used to indicate a selfie mirror image and a selfie non-minor image in the first image and the second image; and the third prompt information is used to indicate a setting manner of the selfie minor switch of the terminal.

9. The method according to claim 1, wherein the method further comprises:

when an image is displayed on the display screen, in response to a minor transformation command entered by the user, displaying, on the display screen, an image that is a minor of the image.

10. A terminal, wherein the terminal comprises a camera, a display screen, and one or more processors;

the one or more processors are configured to: receive an enabling command of a user on the camera; in response to the enabling command on the camera and in response to determining that a selfie mirror switch of the terminal is in a system default state, instruct to display, on the display screen, a preview image that is captured in selfie mode by using the camera; instruct to display a first user interface on the display screen after receiving the enabling command of the user on a photographing shutter, wherein the first user interface comprises a first image and a second image that is a minor of the first image, and the first image is obtained based on the preview image; and receive a selection of the user for the first image or the second image on the first user interface, instruct to stop displaying the first user interface on the display screen, and display the preview image that is captured in selfie mode by using the camera; and the display screen is configured to display specified content according to a command of the processor.

11. The terminal according to claim 10, wherein that the one or more processors are configured to instruct to display the first user interface on the display screen after receiving the enabling command of the user on the photographing shutter comprises:

the one or more processors are configured to: after receiving the enabling command of the user on the photographing shutter, instruct to stop displaying, on the display screen, the preview image that is captured in selfie mode by using the camera, and display the first user interface.

12. The terminal according to claim 10, wherein the first user interface further comprises the preview image that is captured in selfie mode by using a front-facing camera.

13. The terminal according to claim 10, wherein the one or more processors are further configured to: before instructing to display the first user interface on the display screen, use the preview image that is captured after the enabling command is received, as the first image, and determine whether the first image comprises a text; and that the one or more processors are configured to instruct to display the first user interface on the display screen comprises:

the one or more processors are configured to instruct to display the first user interface on the display screen if the first image comprises the text.

14. The terminal according to claim 10, wherein the terminal further comprises a memory; and the one or more processors are further configured to: receive the selection of the user for the first image or the second image on the first user interface, and instruct the memory to store an image selected from the first image and the second image.

15. The terminal according to claim 10, wherein the one or more processors are further configured to: after instructing to display the first user interface on the display screen, if the selection of the user for the first image or the second image is not received within second preset duration, stop displaying the first user interface on the display screen, display the preview image that is captured in selfie mode by using the camera, and delete the first image or the second image.

16. The terminal according to claim 10, wherein the one or more processors are further configured to: if the selected image is a selfie mirror, set the selfie mirror switch of the terminal to an enabled state.

17. The terminal according to claim 10, wherein the one or more processors are further configured to: if the selected image is a selfie non-mirror image, set the selfie mirror switch of the terminal to a disabled state.

18. The terminal according to claim 10, wherein the first user interface further comprises mirror prompt information, and the mirror prompt information comprises at least one of first prompt information, second prompt information, and third prompt information; and the first prompt information is used to prompt the user to select an image that the user intends to store from the first image and the second image; the second prompt information is used to indicate a selfie mirror image and a selfie non-mirror image in the first image and the second image; and the third prompt information is used to indicate a setting manner of the selfie mirror switch of the terminal.

19. The terminal according to claim 10, wherein the one or more processors are further configured to: when the selected image is displayed on the display screen, in response to a mirror transformation command entered by the user, instruct to display, on the display screen, an image that is a mirror of the selected image.

20. A non-transitory computer storage medium, comprising a computer instruction, wherein when the computer instruction is run on a multi-screen terminal, the terminal is enabled to perform the photographing method according to claim 1.

* * * * *

UNITED STATES PATENT AND TRADEMARK OFFICE
CERTIFICATE OF CORRECTION

PATENT NO. : 11,233,940 B2
APPLICATION NO. : 16/492587
DATED : January 25, 2022
INVENTOR(S) : Xiaolong Li et al.

Page 1 of 1

It is certified that error appears in the above-identified patent and that said Letters Patent is hereby corrected as shown below:

In the Claims

Claim 8, Column 31, Line 8, delete "non-minor" and insert --non-mirror--.

Claim 8, Column 31, Line 10, delete "selfie minor switch" and insert --selfie mirror switch--.

Claim 9, Column 31, Line 15, delete "to a minor transformation" and insert --to a mirror transformation--.

Claim 9, Column 31, Line 17, delete "is a minor of" and insert --is a mirror of--.

Claim 10, Column 31, Line 31, delete "minor of the" and insert --mirror of the--.

Signed and Sealed this
Nineteenth Day of April, 2022

Katherine Kelly Vidal
*Director of the United States Patent and Trademark Office*